United States Patent
Goto

(10) Patent No.: US 11,243,096 B2
(45) Date of Patent: Feb. 8, 2022

(54) ENCODER APPARATUS, DRIVE APPARATUS, STAGE APPARATUS, AND ROBOT APPARATUS

(71) Applicant: NIKON CORPORATION, Tokyo (JP)

(72) Inventor: Masahiko Goto, Tokyo (JP)

(73) Assignee: NIKON CORPORATION, Tokyo (JP)

(*) Notice: Subject to any disclaimer, the term of this patent is extended or adjusted under 35 U.S.C. 154(b) by 308 days.

(21) Appl. No.: 16/036,380

(22) Filed: Jul. 16, 2018

(65) Prior Publication Data

US 2018/0340800 A1 Nov. 29, 2018

Related U.S. Application Data

(63) Continuation of application No. PCT/JP2017/000284, filed on Jan. 6, 2017.

(30) Foreign Application Priority Data

Jan. 18, 2016 (JP) .............. JP2016-007468

(51) Int. Cl.
*G01D 5/34* (2006.01)
*G01D 5/347* (2006.01)
(Continued)

(52) U.S. Cl.
CPC ............ *G01D 5/3473* (2013.01); *B25J 19/02* (2013.01); *G01D 5/24447* (2013.01);
(Continued)

(58) Field of Classification Search
CPC ............ G01D 5/3473; G01D 5/24447; G01D 5/34715; G01D 5/56; G01D 5/58; G01D 5/145; B25J 19/02
See application file for complete search history.

(56) References Cited

U.S. PATENT DOCUMENTS 6,119,610 A * 9/2000 Nishizawa ............ D05B 19/14
112/220
6,583,603 B1 * 6/2003 Baldwin ............ G01R 31/3648
320/121
(Continued)

FOREIGN PATENT DOCUMENTS

EP 2 309 230 A1 4/2011
EP 2 682 716 A2 1/2014
(Continued)

OTHER PUBLICATIONS

May 14, 2019 Office Action issued in Japanese Patent Application No. 2017-562508.
(Continued)

*Primary Examiner* — Tony Ko
(74) *Attorney, Agent, or Firm* — Oliff PLC

(57) ABSTRACT

Provided is an encoder apparatus capable of reducing frequency of maintenance of a battery. An encoder apparatus includes: a position detection system including a detector that detects position information on a mover; an electric signal generator that generates an electric signal in response to movement of the mover; and a battery that supplies at least a part of power consumed by the position detection system in accordance with the electric signal generated by the electric signal generator.

21 Claims, 22 Drawing Sheets

(51) Int. Cl.
B25J 19/02 (2006.01)
G01D 5/244 (2006.01)
G01D 5/56 (2006.01)
G01D 5/58 (2006.01)
G01D 5/14 (2006.01)

(52) U.S. Cl.
CPC ......... G01D 5/34715 (2013.01); *G01D 5/145* (2013.01); *G01D 5/56* (2013.01); *G01D 5/58* (2013.01)

(56) References Cited

U.S. PATENT DOCUMENTS

| 2008/0197838 | A1* | 8/2008 | Fischer ............... | G01D 5/2451 324/207.25 |
| 2008/0272834 | A1 | 11/2008 | Uemura et al. | |
| 2014/0009043 | A1 | 1/2014 | Watanabe | |

FOREIGN PATENT DOCUMENTS

| JP | H01-136020 A | 5/1989 |
| JP | H01-248019 A | 10/1989 |
| JP | H08-050034 A | 2/1996 |
| JP | 2004-028894 A | 1/2004 |
| JP | 2007-292608 A | 11/2007 |
| JP | 2008-014799 A | 1/2008 |
| JP | 2010-002267 A | 1/2010 |
| JP | 2012-008024 A | 1/2012 |
| WO | 2005/114111 A1 | 12/2005 |

OTHER PUBLICATIONS

Jul. 10, 2019 Extended European Search Report issued in European Patent Application No. 17741218.6.
Apr. 4, 2017 Search Report issued in International Patent Application No. PCT/JP2017/000284.
Apr. 4, 2017 Written Opinion issued in International Patent Application No. PCT/JP2017/000284.
Jan. 6, 2020 Office Action issued in Chinese Application No. 201780006980.8.
Nov. 23, 2020 Office Action issued in Chinese Patent Application No. 201780006980.8.
Jul. 21, 2021 Office Action issued in European Patent Application No. 17 741 218.6.
Sep. 14, 2021 Office Action issued in Japanese Patent Application No. 2020-166959.

* cited by examiner

ENCODER APPARATUS, DRIVE APPARATUS, STAGE APPARATUS, AND ROBOT APPARATUS

CROSS REFERENCE TO RELATED APPLICATION

This is a Continuation of PCT Application No. PCT/JP2017/000284, filed on Jan. 6, 2017. The contents of the above-mentioned application are incorporated herein by reference.

FIELD OF THE INVENTION

The present invention relates to an encoder apparatus, a drive apparatus, a stage apparatus, and a robot apparatus.

BACKGROUND

A multi-rotation encoder apparatus that distinguishes the number of rotations of a shaft is mounted to various kinds of apparatuses including a robot apparatus (see, for example, Patent Literature 1). During operation of a robot apparatus, for example, the encoder apparatus is supplied with power from a main power supply in the robot apparatus, and detects rotation position information including multi-rotation information indicating the number of rotations and angular position information indicating an angular position within one rotation.

When the robot apparatus finishes predetermined processing, the main power supply in the robot apparatus may be turned off. In this case, the supply of power from the main power supply in the robot apparatus to the encoder apparatus is also stopped. The robot apparatus may need information such as the initial posture when the main power supply is next switched on, that is, the next operation is started. Thus, the encoder apparatus is required to hold multi-rotation information even in the state in which no power is supplied from the outside. To meet this requirement, such an encoder apparatus is used that holds multi-rotation information by power supplied from a battery in a state in which no power is obtained from the main power supply.

CITATION LIST

Patent Literature

[Patent Literature 1] Japanese Unexamined Patent Application Publication No. 8-50034

The encoder apparatus as described above is required to be free from maintenance of the battery (for example, replacement) or have low frequency of maintenance.

SUMMARY

A first aspect of the present invention provides an encoder apparatus including: a position detection system including a detector that detects position information on a mover; an electric signal generator that generates an electric signal in response to movement of the mover; and a battery that supplies at least a part of the power consumed by the position detection system in accordance with the electric signal generated by the electric signal generator.

A second aspect of the present invention provides an encoder apparatus including: a position detector that detects position information on a mover by supply of power; and a signal generator that outputs a signal in response to movement of the mover, in which power is supplied to the position detector based on the output signal.

A third aspect of the present invention provides a drive apparatus including: the encoder apparatus in the first aspect or the second aspect; and a power supplier that supplies power to the mover.

A fourth aspect of the present invention provides a stage apparatus including: a moving object; and the drive apparatus in the third aspect that moves the moving object.

A fifth aspect of the present invention provides a robot apparatus including: the drive apparatus in the third aspect; and a first arm and a second arm that are relatively moved by the drive apparatus.

DETAILED DESCRIPTION OF EMBODIMENTS

First Embodiment

Figure 1:
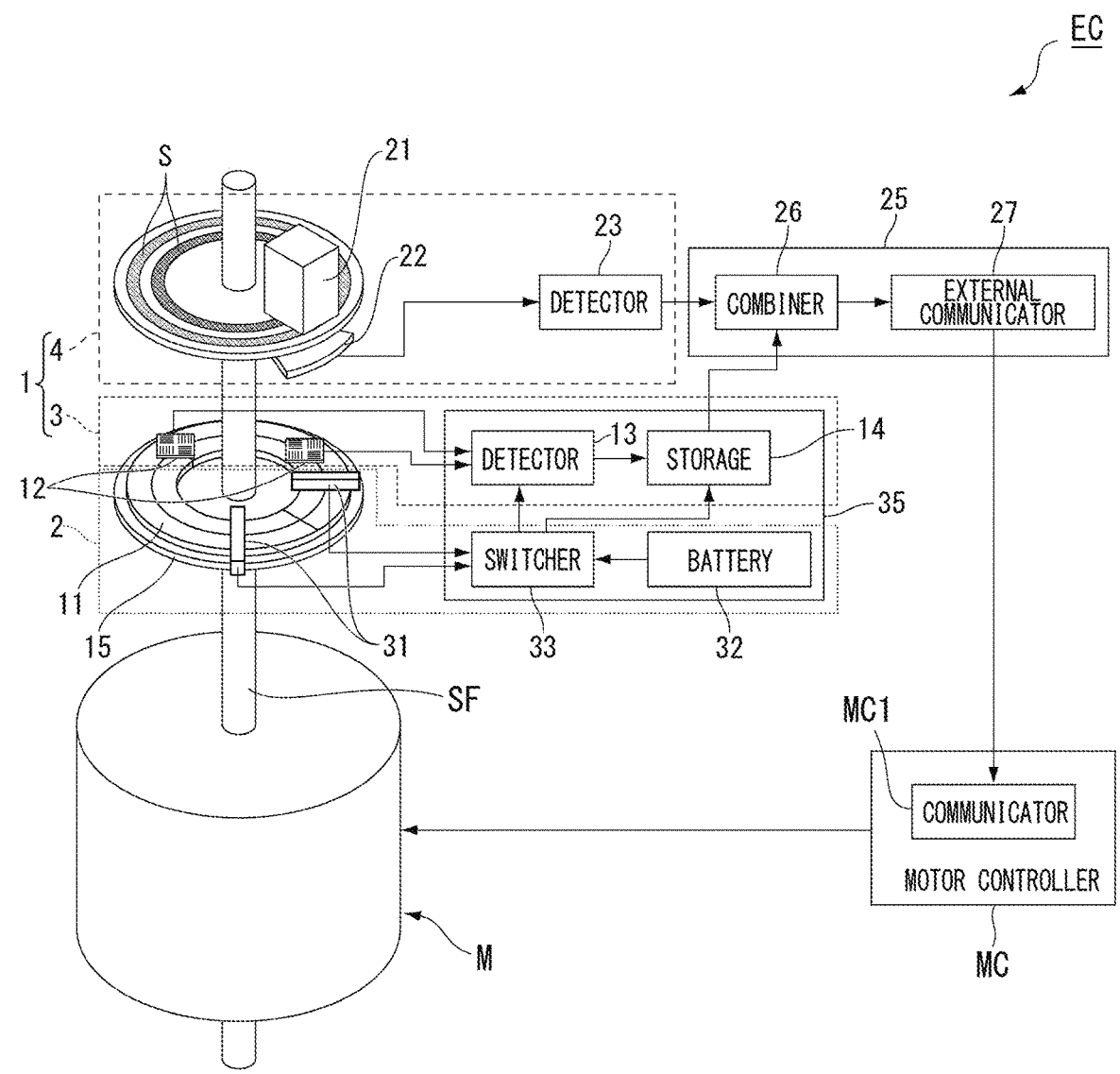
FIG. 1 is a diagram illustrating an encoder apparatus according to a first embodiment.

A first embodiment is described. FIG. 1 is a diagram illustrating an encoder apparatus EC according to the first embodiment. The encoder apparatus EC detects rotation position information on a rotation shaft SF (mover) of a motor M (power supplier). For example, the rotation shaft SF is a shaft (rotor) of the motor M, and may be an acting shaft (output shaft) which is connected to the shaft of the motor M through a power transmitter such as a transmission and which is connected to a load. Rotation position information detected by the encoder apparatus EC is supplied to a motor controller MC. The motor controller MC uses the rotation position information supplied from the encoder apparatus EC to control the rotation of the motor M. The motor controller MC controls the rotation of the rotation shaft SF.

The encoder apparatus EC includes a position detection system 1 and a power supply system 2. The position detection system 1 detects rotation position information on the rotation shaft SF. The encoder apparatus EC is what is called a multi-rotation absolute encoder, and detects rotation position information including multi-rotation information indicating the number of rotations of the rotation shaft SF and angular position information indicating an angular position (rotation angle) within one rotation. The encoder apparatus EC includes a multi-rotation information detector 3 to detect multi-rotation information on the rotation shaft SF and an angle detector 4 to detect the angular position of the rotation shaft SF.

For example, in a state in which an apparatus having the encoder apparatus EC mounted thereon (for example, a drive apparatus, a stage apparatus, a robot apparatus) is powered on, at least a part of the position detection system 1 (for example, the angle detector 4) operates by being supplied with power from the apparatus. For example, in a state in which the apparatus having the encoder apparatus EC mounted thereon is not powered on, at least a part of the position detection system 1 (for example, the multi-rotation information detector 3) operates by being supplied with power from the power supply system 2. For example, in a state in which the supply of power from the apparatus having the encoder apparatus EC mounted thereon is interrupted, the power supply system 2 intermittently supplies power to at least a part of the position detection system 1 (for example, the multi-rotation information detector 3), and the position detection system 1 detects at least a part of the rotation position information (for example, multi-rotation information) on the rotation shaft SF when supplied with power from the power supply system 2.

For example, the multi-rotation information detector 3 detects multi-rotation information based on magnetism. For example, the multi-rotation information detector 3 includes a magnet 11, a magnetic detector 12, a detector 13, and a storage 14. The magnet 11 is provided on a disc plate 15 fixed to the rotation shaft SF. The disc plate 15 rotates together with the rotation shaft SF, and hence the magnet 11 rotates in conjunction with the rotation shaft SF. The magnet 11 is fixed outside the rotation shaft SF, and the relative positions of the magnet 11 and the magnetic detector 12 change in response to the rotation of the rotation shaft SF. The intensity and orientation of the magnetic field on the magnetic detector 12 formed by the magnet 11 change in response to the rotation of the rotation shaft SF. The magnetic detector 12 detects a magnetic field formed by the magnet 11, and the detector 13 detects position information on the rotation shaft SF based on the result of the magnetic detector 12 detecting the magnetic field formed by the magnet. The storage 14 stores therein the position information detected by the detector 13. The configuration of the multi-rotation information detector 3 is described in detail later with reference to FIG. 2A to FIG. 2C, FIG. 3, and others.

The angle detector 4 is an optical or magnetic encoder, and detects position information (angular position information) within one rotation of the scale. For example, when the angle detector 4 is an optical encoder, the angular position within one rotation of the rotation shaft SF is detected, for example, by a light receiving element reading patterning information on the scale. For example, the patterning information on the scale is bright and dark slits on the scale. The angle detector 4 detects angular position information on the rotation shaft SF, which is the same detection target as that of the multi-rotation information detector 3. The angle detector 4 includes a light emitting element 21, a scale S, a light receiving sensor 22, and a detector 23.

The scale S is provided on a disc plate fixed to the rotation shaft SF. The scale S includes an incremental scale and an absolute scale. The scale S may be provided on the disc plate 15, or may be a member integrated with the disc plate 15. For example, the scale S may be provided on a surface of the disc plate 15 on the side opposite to the magnet 11. The scale S may be provided on at least one of the inner side and the outer side of the magnet 11.

The light emitting element 21 (irradiator, light emitter) irradiates the scale S with light. The light receiving sensor 22 (optical detector) detects light that has been emitted from the light emitting element 21 and passed through the scale S. In FIG. 1, the angle detector 4 is a transmissive detector, and the light receiving sensor 22 detects light transmitted through the scale S. The angle detector 4 may be a reflective detector. The light receiving sensor 22 supplies a signal indicating the detection result to the detector 23. The detector 23 uses the detection result of the light receiving sensor 22 to detect an angular position of the rotation shaft SF. For example, the detector 23 uses the result of detecting light from the absolute scale to detect the angular position with a first resolution. The detector 23 uses the result of detecting light from the incremental scale and performs interpolation on the angular position with the first resolution to detect the angular position with a second resolution that is higher than the first resolution.

In the first embodiment, the encoder apparatus EC includes a signal processor 25. The signal processor 25 processes the detection results of the position detection system 1. The signal processor 25 includes a combiner 26 and an external communicator 27. The combiner 26 acquires angular position information with a second resolution detected by the detector 23. The combiner 26 acquires multi-rotation information on the rotation shaft SF from the storage 14 in the multi-rotation information detector 3. The combiner 26 combines the angular position information from the detector 23 and the multi-rotation information from the multi-rotation information detector 3 to calculate rotation position information. For example, when the detection result of the detector 23 is θ [rad] and the detection result of the multi-rotation information detector 3 is n rotations, the combiner 26 calculates $(2\pi \times n + \theta)$ as rotation position information. The rotation position information may be a pair of multi-rotation information and angular position information within one rotation.

The combiner 26 supplies the rotation position information to the external communicator 27. The external communicator 27 is connected to a communicator MC1 in the motor controller MC communicably in a wired or wireless manner. The external communicator 27 supplies rotation position information in a digital form to the communicator MC1 in the motor controller MC. The motor controller MC decodes the rotation position information from the external communicator 27 in the angle detector 4 as necessary. The motor controller MC uses the rotation position information to control power (drive power) supplied to the motor M, thereby controlling the rotation of the motor M.

The power supply system 2 includes an electric signal generation unit 31, a battery (cell) 32, and a switcher 33. The electric signal generation unit 31 generates an electric signal in response to the rotation of the rotation shaft SF. For example, the electric signal includes a waveform whose power (current, voltage) temporally changes. For example, the electric signal generation unit 31 generates power as an electric signal by a magnetic field that changes in response to the rotation of the rotation shaft SF. For example, the electric signal generation unit 31 generates power in response to a change in the magnetic field formed by the magnet 11 used by the multi-rotation information detector 3 to detect multi-rotation positions of the rotation shaft SF. The electric signal generation unit 31 is disposed such that the relative angular position with the magnet 11 changes in response to the rotation of the rotation shaft SF. For example, in the electric signal generation unit 31, a pulsed electric signal is generated when the relative positions of the electric signal generation unit 31 and the magnet 11 are predetermined positions.

The battery 32 supplies at least a part of the power consumed by the position detection system 1 in accordance with the electric signal generated by the electric signal generation unit 31. The battery 32 is a primary cell such as a button cell and a dry cell. For example, the battery 32 is a button cell, and is held in the holder 35. For example, the holder 35 is a circuit board on which at least a part of the position detection system 1 is provided. For example, the holder 35 holds the detector 13, the switcher 33, and the storage 14. In the holder 35, for example, a batter case capable of housing the battery 32 and electrodes and wiring connected to the battery 32 are provided.

The switcher 33 switches between supply and no supply of power from the battery 32 to the position detection system 1 in accordance with the electric signal generated by the electric signal generation unit 31. For example, the switcher 33 initiates supply of power from the battery 32 to the position detection system 1 when the level of the electric signal generated by the electric signal generation unit 31 becomes equal to or higher than a threshold. For example, the switcher 33 initiates supply of power from the battery 32 to the position detection system 1 when power equal to or higher than a threshold is generated by the electric signal generation unit 31. The switcher 33 stops causing the supply of power from the battery 32 to the position detection system 1 when the level of the electric signal generated by the electric signal generation unit 31 becomes lower than the threshold. For example, the switcher 33 stops causing the supply of power from the battery 32 to the position detection system 1 when power generated by the electric signal generation unit 31 becomes lower than the threshold. For example, when a pulsed electric signal is generated in the electric signal generation unit 31, the switcher 33 initiates supply of power from the battery 32 to the position detection system 1 upon the rising of level (power) of the electric signal from Low level to High level, and stops causing the supply of power from the battery 32 to the position detection system 1 after a predetermined time has elapsed since the level (power) of the electric signal changed to Low level.

Figure 2A:
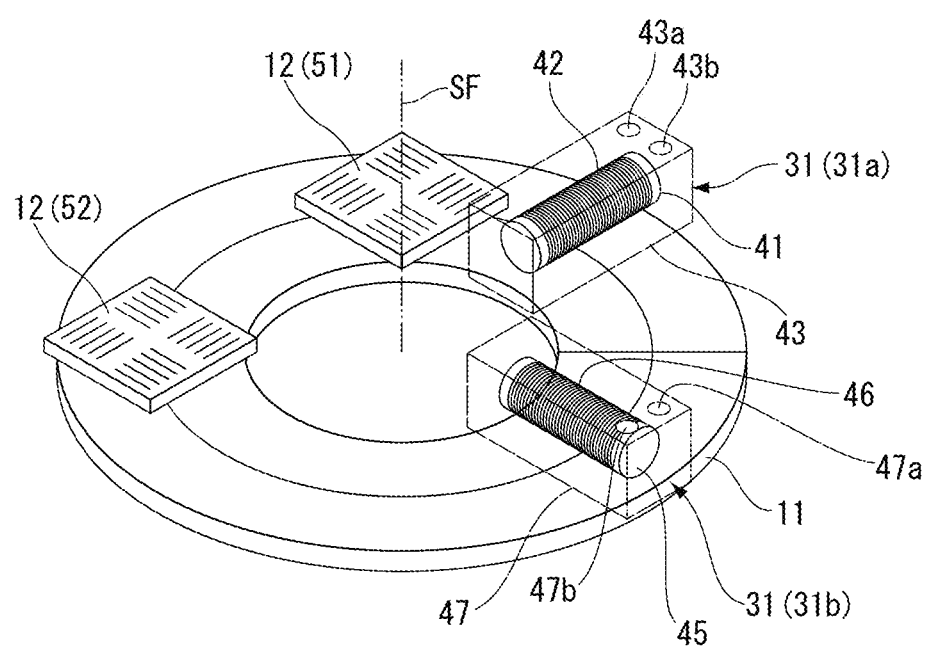
FIG. 2A to FIG. 2C include diagrams illustrating a magnet, an electric signal generation unit, and a magnetic sensor according to the first embodiment.
Figure 2B:
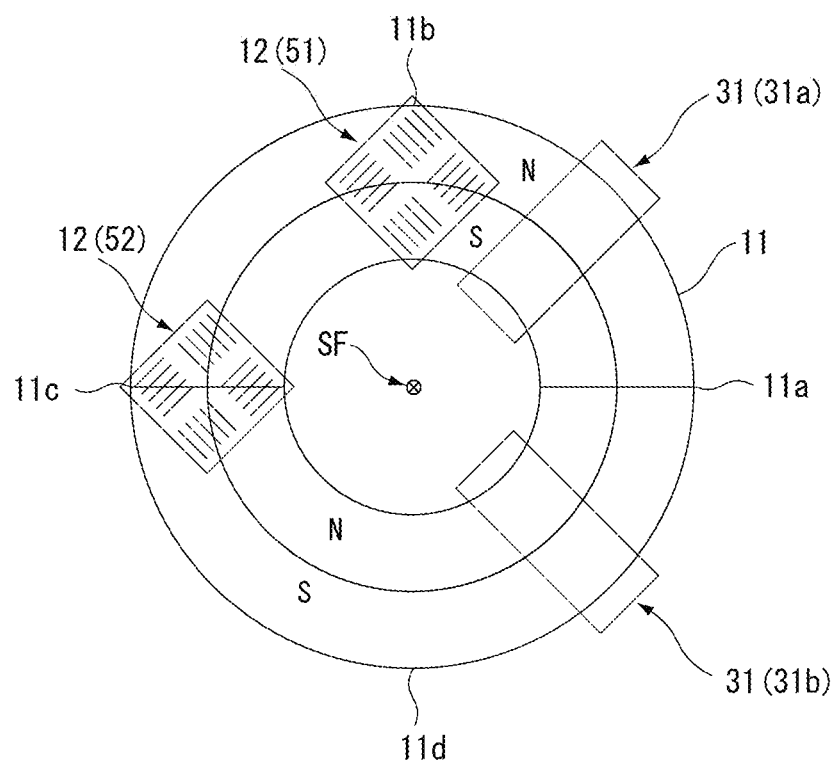
Figure 2C:
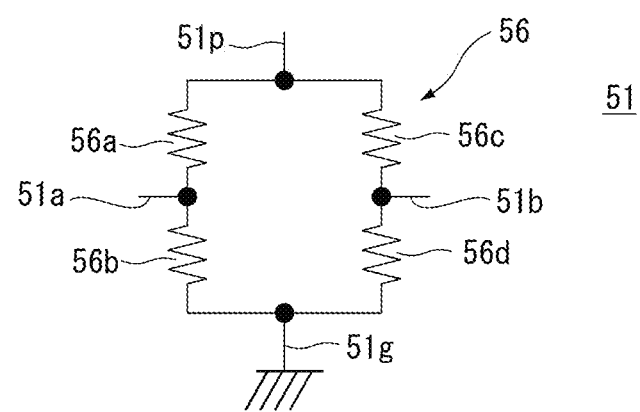

FIG. 2A to FIG. 2C include diagrams illustrating a magnet 11, an electric signal generation unit 31, and a magnetic detector 12 according to the first embodiment. FIG. 2A illustrates a perspective view of the magnet 11, the electric signal generation unit 31, and the magnetic detector 12, and FIG. 2B illustrates a plan view of the magnet 11, the electric signal generation unit 31, and the magnetic detector 12 as seen from the direction of the rotation shaft SF. FIG. 2C illustrates a circuit configuration of the magnetic sensor 51.

The magnet 11 is configured such that the orientation and intensity of the magnetic field in the radiation direction (radial direction) with respect to the rotation shaft SF are changed when rotated. For example, the magnet is a ring-shaped member that is co-axial with the rotation shaft SF. Principal surfaces (front surface and rear surface) of the magnet 11 are substantially perpendicular to the rotation shaft SF. As illustrated in FIG. 2B, the magnet 11 is a permanent magnet magnetized with four poles. In the magnet 11, an N pole and an S pole are arranged in the circumferential direction on each of the inner circumferential side and the outer circumferential side, and the phases on the inner circumferential side and the outer circumferential side are shifted by 180°. In the magnet 11, the boundaries of the N pole and the S pole on the inner circumferential side substantially match with the boundaries of the N pole and the S pole on the outer circumferential side in terms of positions in the circumferential direction (angular positions).

For the sake of description, the rotation in the counterclockwise direction and the rotation in the clockwise direction when viewed from the distal end side of the rotation shaft SF (side opposite to the motor M in FIG. 1) are referred to as "forward rotation" and "reverse direction", respectively. Angles in the forward rotation are represented by positive values, and angles in the reverse direction are represented by negative values. The rotation in the counterclockwise direction and the rotation in the clockwise direction when viewed from the base end side of the rotation shaft SF (side opposite to the motor M in FIG. 1) may be defined as "forward rotation" and "reverse direction", respectively.

In the coordinate system fixed to the magnet 11, the angular position of one boundary between the N pole and the S pole in the circumferential direction is represented by "position 11a", and an angular position rotated by 90° from the position 11a is represented by "position 11b". An angular position rotated by 90° from the position 11b is represented by "position 11c", and a position rotated by 90° from the position 11c is represented by "position 11d". The position 11c is the angular position of the other boundary between the N pole and the S pole in the circumferential direction.

In a first section of 180° from the position 11a in the counterclockwise direction, the N pole is disposed on the outer circumferential side of the magnet 11, and the S pole is disposed on the inner circumferential side of the magnet 11. In the first section, the orientation of the magnetic field in the radial direction is substantially an orientation from the outer circumferential side to the inner circumferential side of the magnet 11. In the first section, the intensity of the magnetic field becomes maximum at the position 11b and minimum near the position 11a and near the position 11c.

In a second section of 180° from the position 11c in the counterclockwise direction, the N pole is disposed on the inner circumferential side of the magnet 11, and the S pole is disposed on the outer circumferential side of the magnet 11. In the second section, the orientation of the magnetic field is an orientation from the inner circumferential side to the outer circumferential side of the magnet 11. In the second section, the intensity of the magnetic field becomes maximum at the position 11d and minimum near the position 11a and near the position 11c.

In this manner, the orientation of the magnetic field formed by the magnet 11 in the radial direction is inverted at the position 11a and inverted at the position 11c. The magnet 11 forms an AC magnetic field whose orientation in the radial direction is inverted in response to the rotation of the magnet 11 with respect to the coordinate system fixed to the outside of the magnet 11. The electric signal generation unit 31 is disposed at a position overlapping with the magnet 11 when viewed from the normal direction of the principal surfaces of the magnet 11.

In the first embodiment, a first electric signal generation unit 31a and a second electric signal generation unit 31b are provided as electric signal generation units 31. The first electric signal generation unit 31a and the second electric signal generation unit 31b are provided not in contact with the magnet 11. The first electric signal generation unit 31a includes a first magnetosensor 41 and a first generator 42. The first magnetosensor 41 and the first generator 42 are fixed to the outside of the magnet 11, and the relative positions thereof with respect to positions on the magnet 11 change in response to the rotation of the magnet 11. For example, in FIG. 2B, the position 11b on the magnet 11 is disposed at a position of 45° from the first electric signal generation unit 31a in the counterclockwise direction. When the magnet 11 rotates in the forward direction (counterclockwise direction) by one rotation from this state, the position 11b, the position 11c, the position 11d, and the position 11a pass near the electric signal generation unit 31 in this order.

The first magnetosensor 41 is a magnetosensitive wire, such as a Wiegand wire. In the first magnetosensor 41, large Barkhausen jump (Wiegand effect) is produced by a change in the magnetic field caused by the rotation of the magnet 11. The first magnetosensor 41 is a columnar member, and its axial direction is set to the radial direction of the magnet 11. In the first magnetosensor 41, when an AC magnetic field is applied in the axial direction thereof and is inverted, a magnetic domain wall from one end to the other end of the first magnetosensor 41 in the axial direction is generated.

The first generator 42 is a high-density coil disposed and wound around the first magnetosensor 41. In the first generator 42, electromagnetic induction is caused by the generation of the magnetic domain wall in the first magnetosensor 41, and an induced current flows. When the position 11a or the position 11c on the magnet 11 illustrated in FIG. 2B passes near the electric signal generation unit 31, a pulsed current (electric signal) is generated in the first generator 42.

The orientation of the current generated in the first generator 42 changes in accordance with the orientations of the magnetic field before and after the inversion. For example, the orientation of a current generated when the magnetic field facing the outer side of the magnet 11 is inverted to the magnetic field facing the inner side of the magnet 11 is opposite to the orientation of a current generated when the magnetic field facing the inner side of the magnet 11 is inverted to the magnetic field facing the outer side of the magnet 11. Power (induced current) generated in the first generator 42 is able to be set by, for example, the number of windings of the high-density coil.

As illustrated in FIG. 2A, the first magnetosensor 41 and the first generator 42 are housed in a case 43. The case 43 is provided with a terminal 43a and a terminal 43b. The high density coil in the first generator 42 has one end electrically connected to the terminal 43a and the other end electrically connected to the terminal 43b. Power generated in the first generator 42 is able to be extracted to the outside of the first electric signal generation unit 31a through the terminal 43a and the terminal 43b.

The second electric signal generation unit 31b is disposed at an angular position that forms an angle of larger than 0° and smaller than 180° from the angular position at which the first electric signal generation unit 31a is disposed. The angle between the angular position of the first electric signal generation unit 31a and the angular position of the second electric signal generation unit 31b is selected from the range of 45° or more and 135° or less, and is about 90° in FIG. 2B. The second electric signal generation unit 31b has the same configuration as in the first electric signal generation unit 31. The second electric signal generation unit 31b includes a second magnetosensor 45 and a second generator 46. The second magnetosensor 45 and the second generator 46 are the same as the first magnetosensor 41 and the first generator 42, respectively, and descriptions thereof are omitted. The second magnetosensor 45 and the second generator 46 are housed in a case 47. The case 47 is provided with a terminal 47a and a terminal 47b. Power generated in the second generator 46 is able to be extracted to the outside of the second electric signal generation unit 31a through the terminal 47a and the terminal 47b.

The magnetic detector 12 includes a magnetic sensor 51 and a magnetic sensor 52. The magnetic sensor 51 is disposed at an angular position of more than 0° and less than 90° with respect to the first magnetosensor 41 (first electric signal generation unit 31a) in the rotation direction of the rotation shaft SF. The magnetic sensor 52 is disposed at an angular position of more than 90° and less than 180° with respect to the first magnetosensor 41 (first electric signal generation unit 31a) in the rotation direction of the rotation shaft SF.

As illustrated in FIG. 2C, the magnetic sensor 51 includes a magnetic resistive element 56; a bias magnet (not illustrated) to apply a magnetic field with constant intensity to the magnetic resistive element 56; and a waveform shaping circuit (not illustrated) to shape the waveform from the magnetic resistive element 56. The magnetic resistive element 56 has a full-bridge configuration in which an element 56a, an element 56b, an element 56c, and an element 56d are connected in series. A signal line between the element 56a and the element 56c is connected to a power supply terminal 51p. A signal line between the element 56b and the element 56d is connected to a ground terminal 51g. A signal line between the element 56a and the element 56b is connected to a first output terminal 51a. A signal line between the element 56c and the element 56d is connected to a second output terminal 51b. The magnetic sensor 52 has the same configuration as that of the magnetic sensor 51, and description thereof is omitted.

Figure 3:
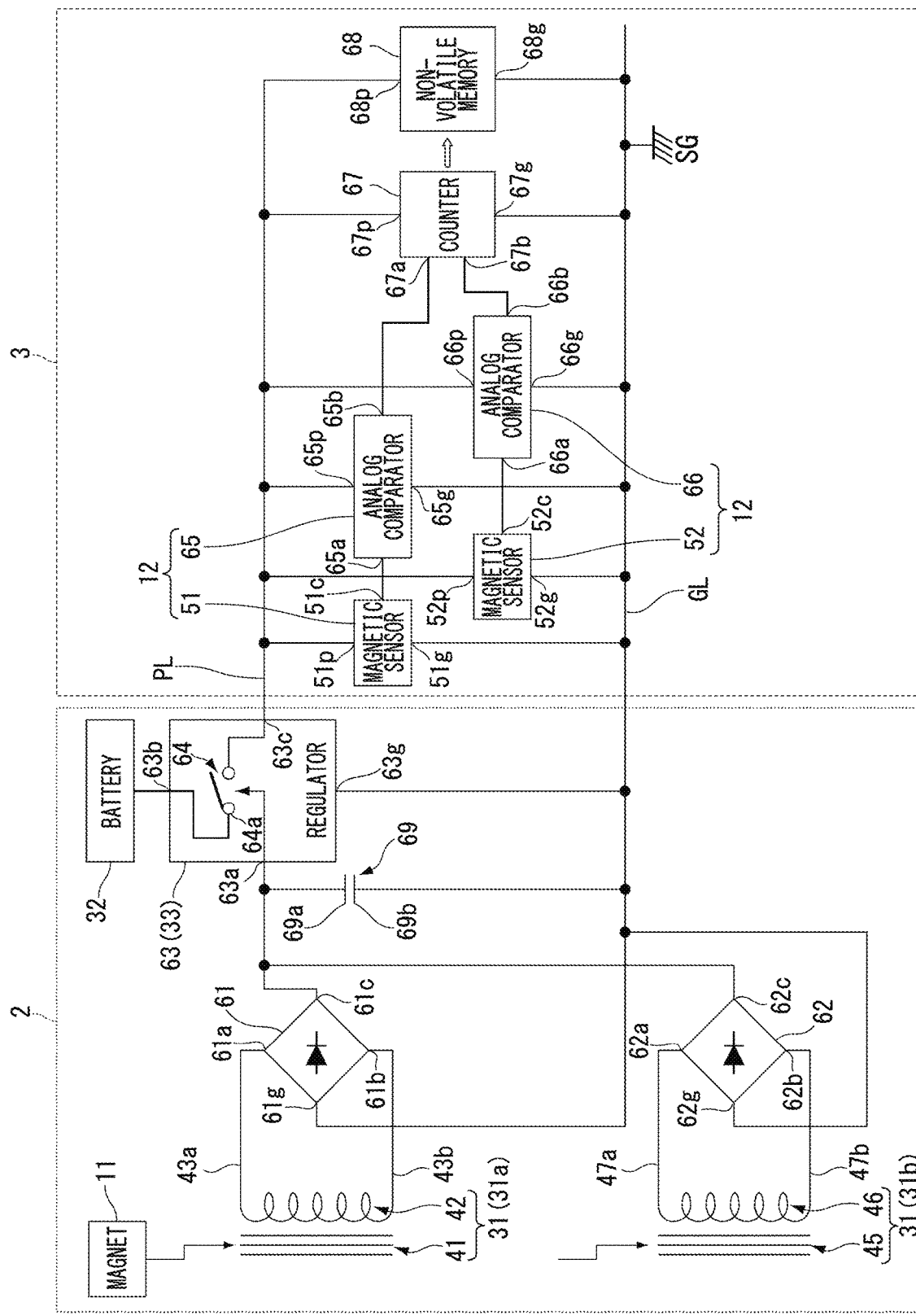
FIG. 3 is a diagram illustrating a circuit configuration of a power supply system and a multi-rotation information detector according to the first embodiment.

FIG. 3 is a diagram illustrating a circuit configuration of the power supply system 2 and the multi-rotation information detector 3 according to the first embodiment. The power supply system 2 includes a first electric signal generation unit 31a, a rectifier stack 61, a second electric signal generation unit 31b, a rectifier stack 62, and a battery 32. The power supply system 2 includes a regulator 63 as the switcher 33 illustrated in FIG. 1.

The rectifier stack 61 is a rectifier to rectify a current flowing from the first electric signal generation unit 31a. The rectifier stack 61 has a first input terminal 61a connected to a terminal 43a of the first electric signal generation unit 31a. The rectifier stack 61 has a second input terminal 61b connected to a terminal 43b of the first electric signal generation unit 31a. The rectifier stack 61 has a ground terminal 61g connected to a ground line GL that is supplied with the same potential as the signal ground SG. When the multi-rotation information detector 3 operates, the potential of the ground line GL serves as a reference potential of the circuit. The rectifier stack 61 has an output terminal 61c connected to a control terminal 63a of the regulator 63.

The rectifier stack 62 is a rectifier to rectify a current flowing from the second electric signal generation unit 31b. The rectifier stack 62 has a first input terminal 62a connected to a terminal 47a of the second electric signal generation unit 31b. The rectifier stack 62 has a second input terminal 62b connected to a terminal 47b of the second electric signal generation unit 31b. The rectifier stack 62 has a ground terminal 62g connected to the ground line GL. The rectifier stack 62 has an output terminal 62c connected to the control terminal 63a of the regulator 63.

The regulator 63 adjusts power supplied from the battery 32 to the position detection system 1. The regulator 63 may include a switch 64 provided in a power supply path between the battery 32 and the position detection system 1. The regulator 63 controls the operation of the switch 64 based on an electric signal generated by the electric signal generation unit 31.

The regulator 63 has an input terminal 63b connected to the battery 32. The regulator 63 has an output terminal 63c connected to a power supply line PL. The regulator 63 has a ground terminal 63g connected to the ground line GL. The control terminal 63a of the regulator 63 is an enable terminal. The regulator 63 maintains the potential of the output terminal 63c to a predetermined voltage in the state in which a voltage of a threshold or more is applied to the control terminal 63a. For example, an output voltage (the above-mentioned predetermined voltage) of the regulator 63 is 3 V when the counter 67 is formed of a CMOS. For example, an operating voltage of the non-volatile memory 68 in the storage 14 is set to the same voltage as the predetermined voltage. The predetermined voltage is a voltage necessary for the supply of power, and may be not only a constant voltage value but also a voltage that gradually changes.

In the switch 64, a first terminal 64a is connected to the input terminal 63b, and a second terminal 64b is connected to the output terminal 63c. The regulator 63 uses an electric signal supplied from the electric signal generation unit 31 to the control terminal 63a as a control signal (enable signal) to switch between a conductive state and an insulated state of the first terminal 64a and the second terminal 64b of the switch 64. For example, the switch 64 includes a switching element such as a MOS and a TFT. The first terminal 64a and the second terminal 64b are a source electrode and a drain electrode, and a gate electrode is connected to the control terminal 63a. In the switch 64, the gate electrode is charged with an electric signal (power) generated by the electric signal generation unit 31, and when the potential of the gate electrode becomes equal to or higher than a threshold, the source electrode and the drain electrode become conductive (ON state). The switch 64 may be provided outside the regulator 63, and, for example, may be an external relay.

The multi-rotation information detector 3 includes, as the magnetic detector 12, a magnetic sensor 51, an analog comparator 65, a magnetic sensor 52, and an analog comparator 66. The magnetic detector 12 detects the magnetic field formed by the magnet 11 by using power supplied from the battery 32. The multi-rotation information detector 3 includes a counter 67 as the detector 13 illustrated in FIG. 1, and a non-volatile memory 68 as the storage 14 illustrated in FIG. 1.

The power supply terminal 51p of the magnetic sensor 51 is connected to the power supply line PL. The ground terminal 51g of the magnetic sensor 51 is connected to the ground line GL. The output terminal 51c of the magnetic sensor 51 is connected to an input terminal 65a of the analog comparator 65. In the first embodiment, the output terminal 51c of the magnetic sensor 51 outputs a voltage corresponding to the difference between the potential of the second output terminal 51b illustrated in FIG. 2C and the reference potential. The analog comparator 65 is a comparator to compare the voltage output from the magnetic sensor 51 with a predetermined voltage. The power supply terminal 65p of the analog comparator 65 is connected to the power supply line PL. The ground terminal 65g of the analog comparator 65 is connected to the ground line GL. An output terminal 65b of the analog comparator 65 is connected to a first input terminal 67a of the counter 67. The analog comparator 65 outputs a signal of H level from the output terminal when the output voltage of the magnetic sensor 51 is equal to or higher than a threshold, and outputs a signal of L level from the output terminal when the output voltage of the magnetic sensor 51 is lower than the threshold.

The magnetic sensor 52 and the analog comparator 66 have the same configurations as those of the magnetic sensor 51 and the analog comparator 65. The power supply terminal 52p of the magnetic sensor 52 is connected to the power supply line PL. The ground terminal 52g of the magnetic sensor 52 is connected to the ground line GL. The output terminal 52c of the magnetic sensor 52 is connected to an input terminal 66a of the analog comparator 66. The power supply terminal 66p of the analog comparator 66 is connected to the power supply line PL. The ground terminal 66g of the analog comparator 66 is connected to the ground line GL. The output terminal 58b of the analog comparator is connected to a second input terminal 67b of the counter 67. The analog comparator 66 outputs a signal of H level from the output terminal when the output voltage of the magnetic sensor 52 is equal to or higher than a threshold, and outputs a signal of L level from an output terminal 66b when the output voltage of the magnetic sensor 52 is lower than the threshold.

The counter 67 counts multi-rotation information on the rotation shaft SF by using power supplied from the battery 32. For example, the counter 67 includes a CMOS logic circuit. The counter 67 operates with use of power supplied through a power supply terminal 67p and a ground terminal 67g. The power supply terminal 67p of the counter 67 is connected to the power supply line PL. The ground terminal 67g of the counter 67 is connected to the ground line GL. The counter 67 performs counting processing by using a voltage supplied through the first input terminal 67a and a voltage supplied through the second input terminal 67b as control signals.

The non-volatile memory 68 stores therein at least a part of the rotation position information detected by the detector 13 (for example, multi-rotation information) by using power supplied from the battery 32 (performs writing operation). The non-volatile memory 68 stores therein counting results of the counter 67 (multi-rotation information) as the rotation position information detected by the detector 13. A power supply terminal 68p of the non-volatile memory 68 is connected to the power supply line PL. A ground terminal 68g of the storage 14 is connected to the ground line GL. For example, the storage includes a non-volatile memory, and is capable of holding information written while being supplied with power even in the state in which no power is supplied.

In the first embodiment, a capacitor 69 is provided between the rectifier stack 61, the rectifier stack 62, and the regulator 63. A first electrode 69a of the capacitor is connected to a signal line that connects the rectifier stack 61, the rectifier stack 62, and the control terminal 63a of the regulator 63. A second electrode 69b of the capacitor 69 is connected to the ground line GL. The capacitor 69 is what is called a smoothing capacitor, and reduces pulsation to reduce load on the regulator. For example, the constant of the capacitor 69 is set such that the supply of power from the battery 32 to the detector 13 and the storage 14 is maintained in a period from when the detector 13 detects rotation position information to when the rotation position information is written in the storage 14.

Figure 4:
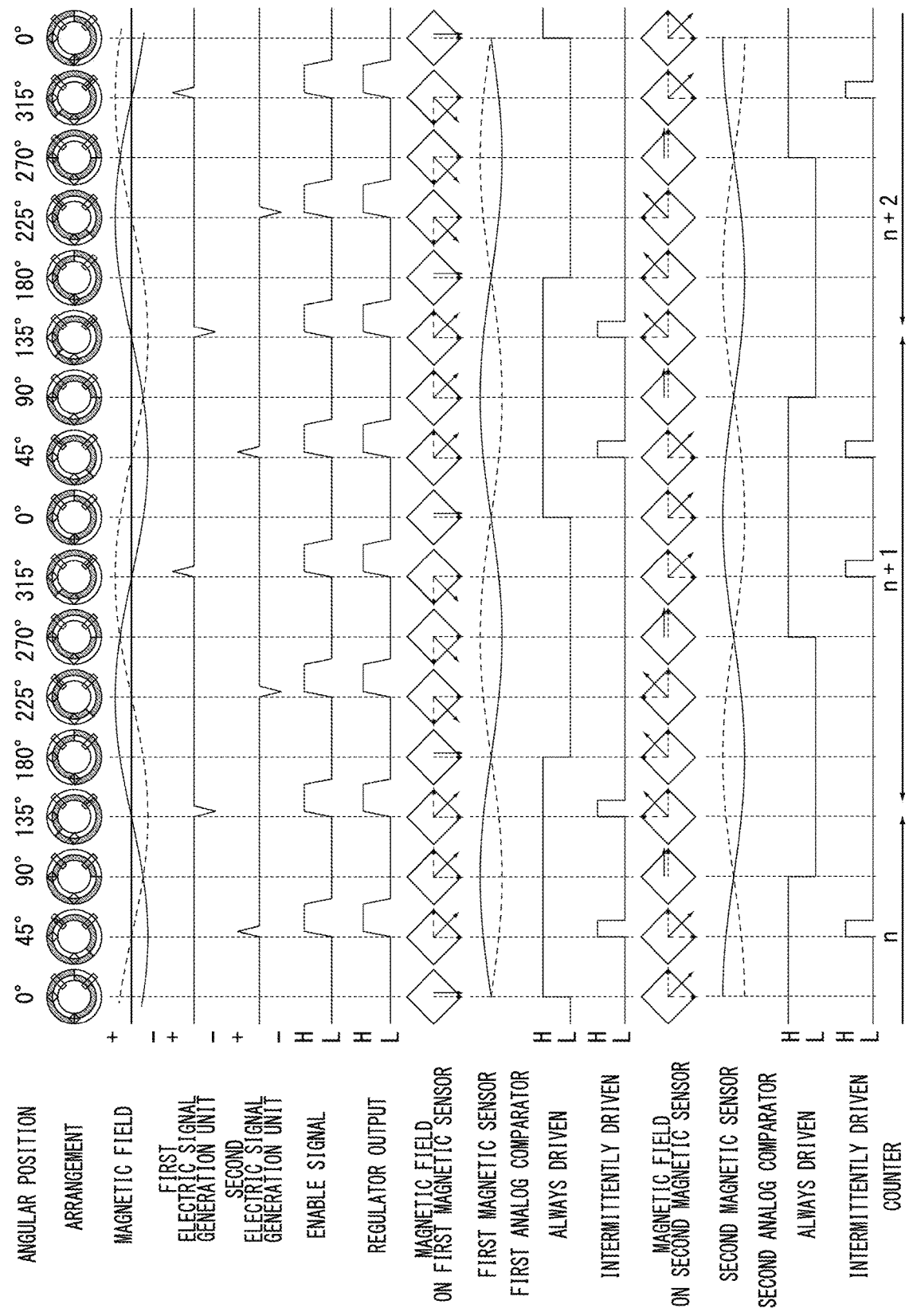
FIG. 4 is a diagram illustrating operation of the encoder apparatus during forward rotation according to the first embodiment.
Figure 5:
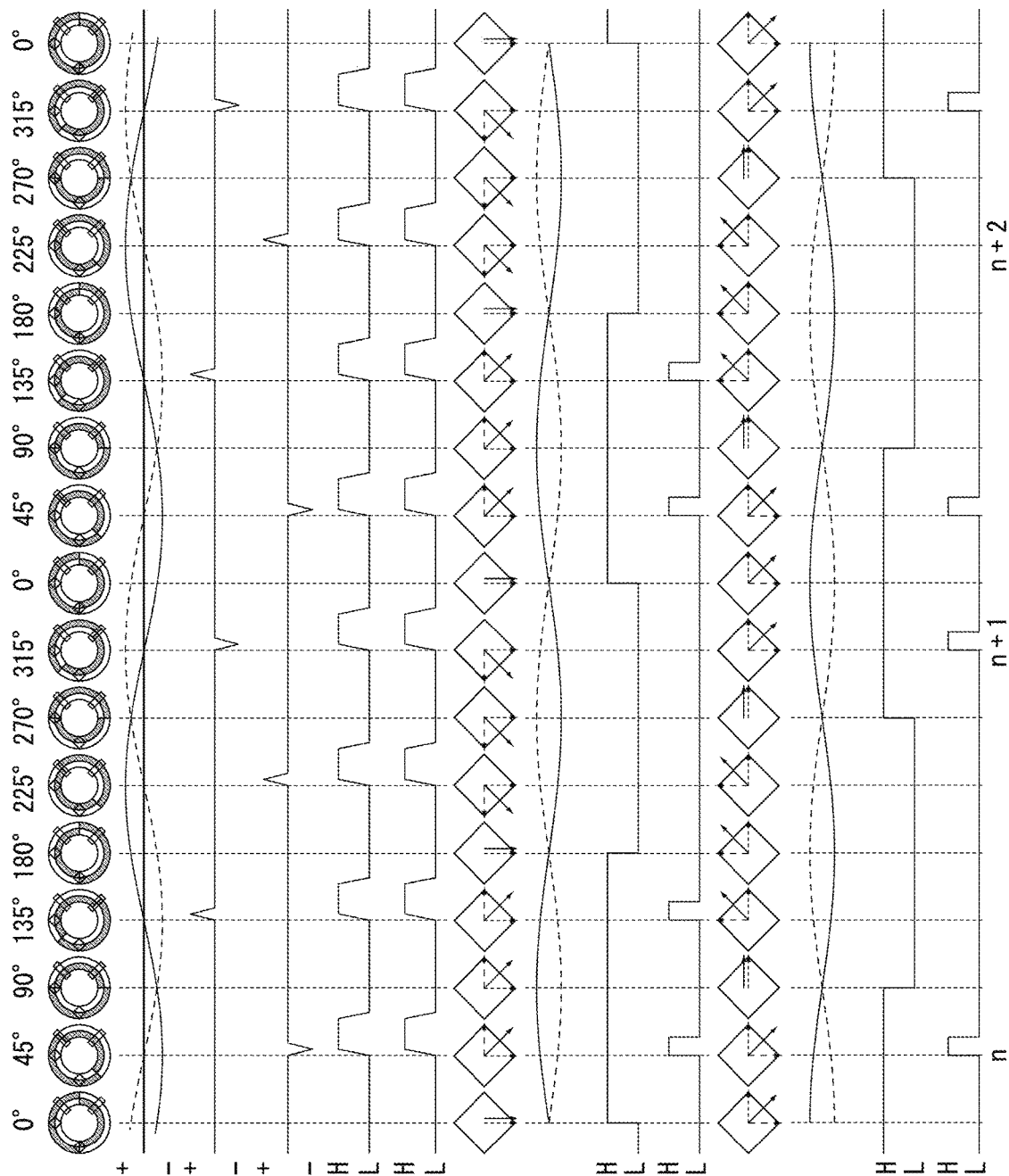
FIG. 5 is a diagram illustrating operation of the encoder apparatus during reverse direction according to the first embodiment.

Next, the operation of the power supply system 2 and the multi-rotation information detector 3 is described. FIG. 4 is a timing chart illustrating the operation of the multi-rotation information detector 3 when the rotation shaft SF rotates in the counterclockwise direction (forward rotation). FIG. 5 is a timing chart illustrating the operation of the multi-rotation information detector 3 when the rotation shaft SF rotates in the clockwise direction (reverse direction).

In "MAGNETIC FIELD" in FIG. 4 and FIG. 5, solid lines represent a magnetic field at the position of the first electric signal generation unit 31a, and broken lines represent a magnetic field at the position of the second electric signal generation unit 31b. "FIRST ELECTRIC SIGNAL GENERATION UNIT" and "SECOND ELECTRIC SIGNAL GENERATION UNIT" represent the output of the first electric signal generation unit 31a and the output of the second electric signal generation unit 31b, respectively, and the output of a current flowing in one direction is positive (+) while the output of a current flowing in the reverse direction is negative (−). "ENABLE SIGNAL" represents a potential applied to the control terminal 63a of the regulator 63 in response to an electric signal generated by the electric signal generation unit 31, and High level is represented by "H" while Low level is represented by "L". "REGULATOR" represents the output of the regulator 63, and High level is represented by "H" while Low level is represented by "L".

"MAGNETIC FIELD ON FIRST MAGNETIC SENSOR" and "MAGNETIC FIELD ON SECOND MAGNETIC SENSOR" in FIG. 4 and FIG. 5 represent a magnetic field formed on the magnetic sensor 51 and a magnetic field formed on the magnetic sensor 52. A magnetic field formed by the magnet 11 is represented by long broken lines, a magnetic field formed by the bias magnet is represented by short broken lines, and a composite magnetic field thereof is represented by solid lines. "FIRST MAGNETIC SENSOR" and "SECOND MAGNETIC SENSOR" represent the outputs of the magnetic sensor 51 and the magnetic sensor 52 when always driven, respectively. The output from the first output terminal is illustrated by broken lines, and the output from the second output terminal is illustrated by solid lines. "FIRST ANALOG COMPARATOR" and "SECOND ANALOG COMPARATOR" represent the outputs from the analog comparator 65 and the analog comparator 66, respectively. The output when the magnetic sensor and the analog comparator are always driven is indicated by "ALWAYS DRIVEN", and the output when the magnetic sensor and the analog comparator are intermittently driven is indicated by "INTERMITTENTLY DRIVEN".

First, the operation when the rotation shaft SF rotates in the counterclockwise direction is described with reference to FIG. 4. The first electric signal generation unit 31a outputs a current pulse flowing in the reverse direction (negative in the "first electric signal generation unit") at an angular position of 135°. The first electric signal generation unit 31a outputs a current pulse flowing in the forward direction (positive in the "first electric signal generation unit") at an angular position of 315°. The second electric signal generation unit 31b outputs a current pulse flowing in the forward direction (positive in the "second electric signal generation unit") at an angular position of 45°. The second electric signal generation unit 31b outputs a current pulse flowing in the reverse direction (negative in the "second electric signal generation unit") at an angular position of 225°. Thus, the enable signal is switched to High level at each of an angular position of 45°, an angular position of 135°, an angular position of 225°, and an angular position of 315°. In response to the state in which the enable signal is maintained to High level, the regulator 63 supplies a predetermined voltage to the power supply line PL at each of an angular position of 45°, an angular position of 135°, an angular position of 225°, and an angular position of 315°.

In the first embodiment, the output of the magnetic sensor 51 and the output of the magnetic sensor 52 have a phase difference of 90°, and the detector 13 uses the phase difference to detect rotation position information. The output of the magnetic sensor 51 is a positive sine wave in the range from an angular position of 0° to an angular position of 180°. In this angle range, the regulator 63 outputs power at an angular position of 45° and an angular position of 135°. The magnetic sensor 51 and the analog comparator 65 are driven by power supplied at an angular position of 45° and an angular position of 135°. A signal output from the analog comparator 65 (hereinafter referred to as "A-phase signal") is maintained to L level in the state in which no power is supplied, and becomes H level at an angular position of 45° and an angular position of 135°.

The output of the magnetic sensor 52 is a positive sine wave in the range from an angular position of 270° (−90°) to an angular position of 90°. In this angle range, the regulator 63 outputs power at an angular position of 315° (−45°) and an angular position of 45°. The magnetic sensor 52 and the analog comparator 66 are driven by power supplied at an angular position of 315° and an angular position of 45°. A signal output from the analog comparator 66 (hereinafter referred to as "B-phase signal") is maintained to L level in the state in which no power is supplied, and becomes H level at an angular position of 315° and an angular position of 45°.

When the A-phase signal supplied to the counter 67 is H level (H) and the B-phase signal supplied to the counter 67 is L level, a pair of the signal levels is represented by (H,L). In FIG. 4, a pair of signal levels at an angular position of 315° are (L,H), a pair of signal levels at an angular position of 45° are (H,H), and a pair of signal levels at an angular position of 135° are (H,L).

When one or both of the detected A-phase signal and B-phase signal are H level, the counter 67 stores a pair of the signal levels in the storage 14. When one or both of the A-phase signal and the B-phase signal detected next are H level, the counter 67 reads the previous pair of levels from the storage 14, and compares the pair of previous levels and the pair of current levels to determine the rotation direction.

For example, when the pair of previous signal levels are (H,H) and the current signal levels are (H,L), the angular position in the previous detection is 45° and the angular position in the current detection is 135°, and hence it is understood that the rotation direction is the counterclockwise direction (forward rotation). When the pair of current levels are (H,L) and the pair of previous levels are (H,H), the counter 67 supplies an up signal indicating that the counter is to be incremented to the storage 14. When the storage 14 detects the up signal from the counter 67, the storage 14 updates the stored multi-rotation information to a value incremented by 1.

Next, the operation when the rotation shaft SF rotates in the clockwise direction is described with reference to FIG. 5. The first electric signal generation unit 31a outputs a current pulse flowing in the forward direction (positive in the "first electric signal generation unit") at an angular position of 135°. The first electric signal generation unit 31a outputs a current pulse flowing in the reverse direction (negative in the "first electric signal generation unit") at an angular position of 315°. The second electric signal generation unit 31b outputs a current pulse flowing in the reverse direction (negative in the "second electric signal generation unit") at an angular position of 45°. The second electric signal generation unit 31b outputs a current pulse flowing in the forward direction (positive in the "second electric signal generation unit") at an angular position of 225°. In this manner, when the rotation direction of the rotation shaft SF is reversed, the orientation of the current output from the first electric signal generation unit 31a and the orientation of the current output from the second electric signal generation unit 31b are reversed.

The rectifier stack 61 and the rectifier stack 62 rectify the currents output from the respective electric signal generation units, and hence the enable signals do not depend on the orientations of the currents output from the respective electric signal generation units. Thus, similarly to the forward rotation, the regulator 63 supplies a predetermined voltage to the power supply line PL at each of an angular position 45°, an angular position of 135°, an angular position of 225°, and an angular position of 315°.

The counter 67 determines the rotation direction in the same manner as described above for the forward rotation. When the pair of current signal levels are (H,L) and the previous signal levels are (L,H), the angular position in the previous detection is 315° (−45°) and the angular position in the current detection is 135° (−225°), and hence it is understood that the rotation direction is the clockwise direction (reverse direction). When the pair of current levels are (H,L) and the pair of previous levels are (L,H), the counter 67 supplies a down signal indicating that the counter is to be decremented to the storage 14. When the storage 14 detects the down signal from the counter 67, the storage 14 updates the stored multi-rotation information to a value decremented by 1. In this manner, the multi-rotation information detector 3 according to the first embodiment is capable of detecting multi-rotation information while determining the rotation direction of the rotation shaft SF.

As described above, in the encoder apparatus EC according to the first embodiment, in a short period after an electric signal is generated in the electric signal generation unit 31, power is supplied from the battery 32 to the multi-rotation information detector 3, and the multi-rotation information detector 3 is dynamically driven (intermittently driven). The supply of power to the multi-rotation information detector 3 is interrupted after the end of the detection and writing of the multi-rotation information, but the counted value is held because it is stored in the storage 14. Such a sequence is repeated each time a predetermined position on the magnet 11 passes near the electric signal generation unit 31 even in the state in which the supply of power from the outside is interrupted. The multi-rotation information stored in the storage 14 is read to the motor controller MC when the motor M is next activated, and is used, for example, to calculate the initial position of the rotation shaft SF. In such an encoder apparatus EC, the battery 32 supplies at least a part of the power consumed by the position detection system 1 in accordance with the electric signal generated by the first electric signal generation unit 31, and hence the lifetime of the battery 32 is able to be increased. The maintenance (for example, replacement) of the battery 32 is able to be eliminated, and the frequency of maintenance is able to be reduced. For example, when the lifetime of the battery 32 is longer than the lifetimes of other parts in the encoder apparatus EC, the battery 32 is not required to be replaced.

The use of a magnetosensitive wire, such as a Wiegand wire, enables a pulse current output to be obtained from the electric signal generation unit 31 even when the rotation of the magnet 11 is extremely low. Consequently, for example, even when the rotation of the rotation shaft SF (magnet 11) is extremely low in the state in which the motor M is not supplied with power, the output of the electric signal generation unit 31 is useable as an electric signal.

Second Embodiment

Figure 6:
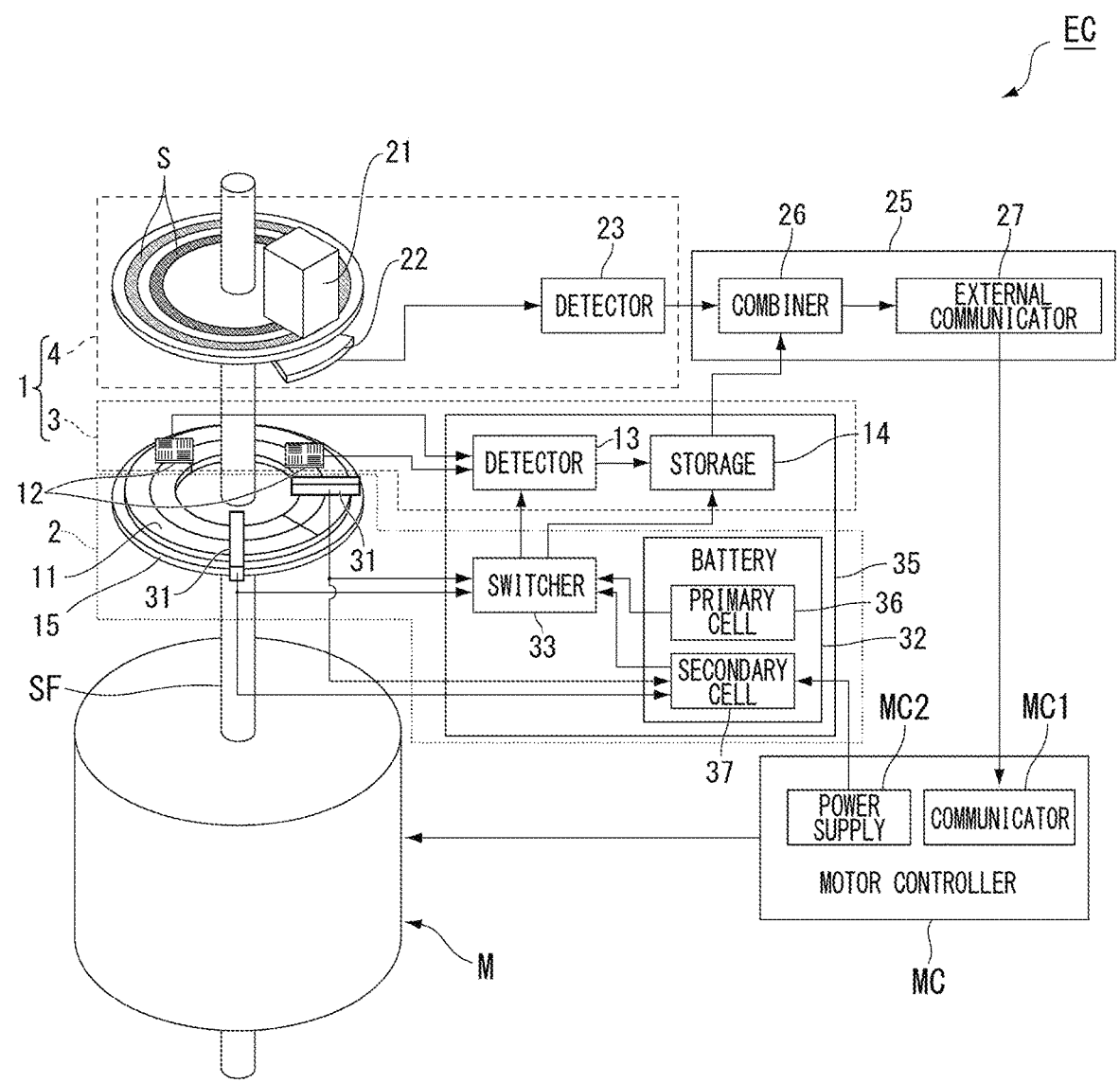
FIG. 6 is a diagram illustrating an encoder apparatus according to a second embodiment.

A second embodiment is described. In the second embodiment, the same configurations as those in the above-mentioned embodiment are denoted by the same reference symbols, and descriptions thereof are omitted or simplified. FIG. 6 is a diagram illustrating an encoder apparatus EC according to the second embodiment. In the second embodiment, a battery 32 includes a primary cell 36 and a secondary cell 37. A motor controller MC includes a power supply MC2, and the secondary cell 37 is charged with power supplied from the power supply MC2. For example, the power supply MC2 is a power supply to supply power used to drive a rotation shaft SF (mover), and supplies power to a motor M. The secondary cell 37 may be charged by being supplied with power from the power supply MC2 in the state in which the power supply MC2 is capable of supplying power to the motor M (for example, in the state in which the main power supply is turned on). At least a part of the charging to the secondary cell 37 may be performed by using power of the electric signal generated by the electric signal generator (electric signal generation unit 31) in the state in which the power supply MC2 does not supply power to the motor M (for example, in the state in which the main power supply is turned off). In this case, the secondary cell 37 is able to be charged even in the state in which the supply of power to the encoder apparatus EC from the outside is interrupted (for example, power failure).

The battery 32 is capable of supplying at least a part of the power consumed by the position detection system 1 from the primary cell 36 or the secondary cell 37. For example, the primary cell 36 and the secondary cell 37 are electrically connected to the switcher 33, and the switcher 33 causes the supply of power from the primary cell 36 or from the secondary cell 37 to the detector 13 and the storage 14.

Figure 7:
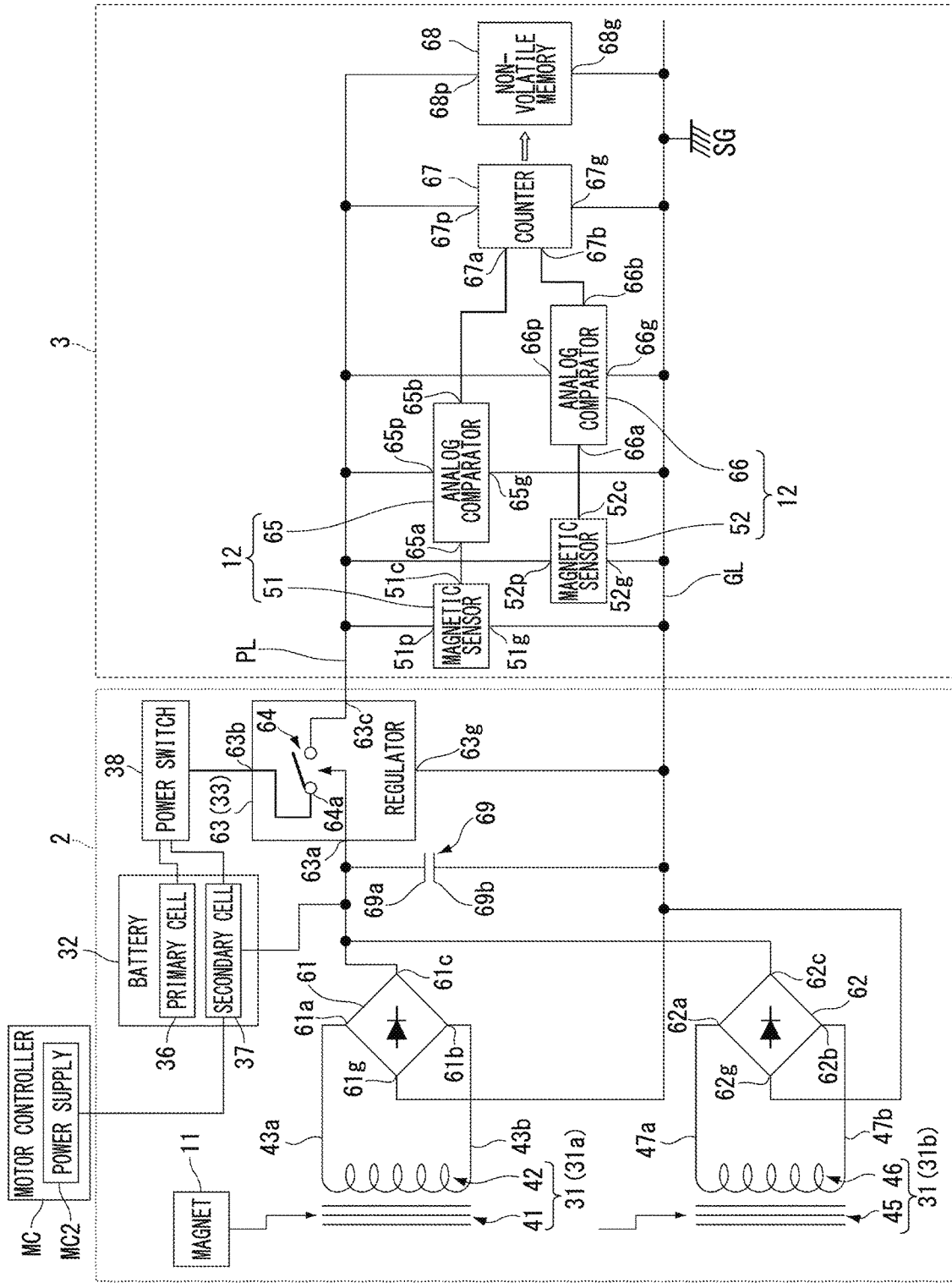
FIG. 7 is a diagram illustrating a circuit configuration of a power supply system and a multi-rotation information detector according to the second embodiment.

FIG. 7 is a diagram illustrating the encoder apparatus EC according to the second embodiment. The secondary cell 37 is electrically connected to the power supply MC2 in the motor controller MC. In at least a part of a period during which the power supply MC2 in the motor controller MC is capable of supplying power (for example, the on state of the main power supply), power is supplied from the power supply MC2 to the secondary cell 37, and the secondary cell 37 is charged with the power. In a period during which the power supply MC2 in the motor controller MC is incapable of supplying power (for example, the off state of the main power supply), the supply of power from the power supply MC2 to the secondary cell 37 is interrupted.

The secondary cell 37 may also be electrically connected to a transmission path of the electric signal from the electric signal generation unit 31. In this case, the secondary cell 37 is able to be charged with power of the electric signal from the electric signal generation unit 31. For example, the secondary cell 37 is electrically connected to a circuit between the rectifier stack 61 and the regulator 63. In the state in which the supply of power from the power supply MC2 is interrupted, the secondary cell 37 becomes chargeable with power of the electric signal generated by the electric signal generation unit 31 in response to the rotation of the rotation shaft SF. The secondary cell 37 may be charged with power of an electric signal generated by the electric signal generation unit 31 when the rotation shaft SF is driven by the motor M to rotate.

The encoder apparatus EC according to the second embodiment selects which of the primary cell 36 and the secondary cell 37 is used to supply power to the position detection system 1 in the state in which the supply of power from the outside is interrupted. The power supply system 2 includes a power switcher (power selector, selector) 38, and the power switcher 38 switches (selects) which of the primary cell 36 and the secondary cell 37 is used to supply power to the position detection system 1. A first input terminal of the power switcher 38 is electrically connected to a positive electrode of the primary cell 36, and a second input terminal of the power switcher 38 is electrically connected to the secondary cell 37. An output terminal of the power switcher 38 is electrically connected to the input terminal 63b of the regulator 63.

For example, the power switcher 38 selects the primary cell 36 or the secondary cell 37 as a battery that supplies power to the position detection system 1 based on the remaining amount of the secondary cell 37. For example, when the remaining amount of the secondary cell 37 is equal to or more than a threshold, the power switcher 38 causes the supply of power from the secondary cell 37, but does not cause the supply of power from the primary cell 36. The threshold is set based on power to be consumed by the position detection system 1, and is set to, for example, power to be supplied to the position detection system 1 or more. For example, when power consumed by the position detection system 1 is able to be sourced from power from the secondary cell 37, the power switcher 38 performs control such that power is supplied from the secondary cell 37 and no power is supplied from the primary cell 36. When the remaining amount of the secondary cell 37 is less than the threshold, the power switcher 38 does not cause the supply of power from the secondary cell 37, but causes the supply of power from the primary cell 36. For example, the power switcher 38 may serve also as a charger that controls the charging of the secondary cell 37, and may determine whether the remaining amount of the secondary cell 37 is equal to or more than a threshold by using information on the remaining amount of the secondary cell 37 used to control the charging.

The encoder apparatus EC according to the second embodiment uses the secondary cell 37 in combination, thus enabling the wear of the primary cell 36 to be delayed. Consequently, the encoder apparatus EC is free from maintenance (for example, replacement) of the battery 32 or has low frequency of maintenance.

The battery 32 only needs to include at least one of the primary cell 36 and the secondary cell 37. In the second embodiment, power is alternatively supplied from the primary cell 36 or the secondary cell 37, but power may be supplied from the primary cell 36 and the secondary cell 37 in parallel. For example, a processor to which power is supplied from the primary cell 36 and a processor to which power is supplied from the secondary cell 37 may be determined in accordance with power consumption of the processors (for example, the magnetic sensor 51, the counter 67, the non-volatile memory 68) in the position detection system 1. The secondary cell 37 only needs to be charged by using at least one of power supplied from the power supply MC2 and power of an electric signal generated by the electric signal generation unit 31.

Third Embodiment

Figure 8:
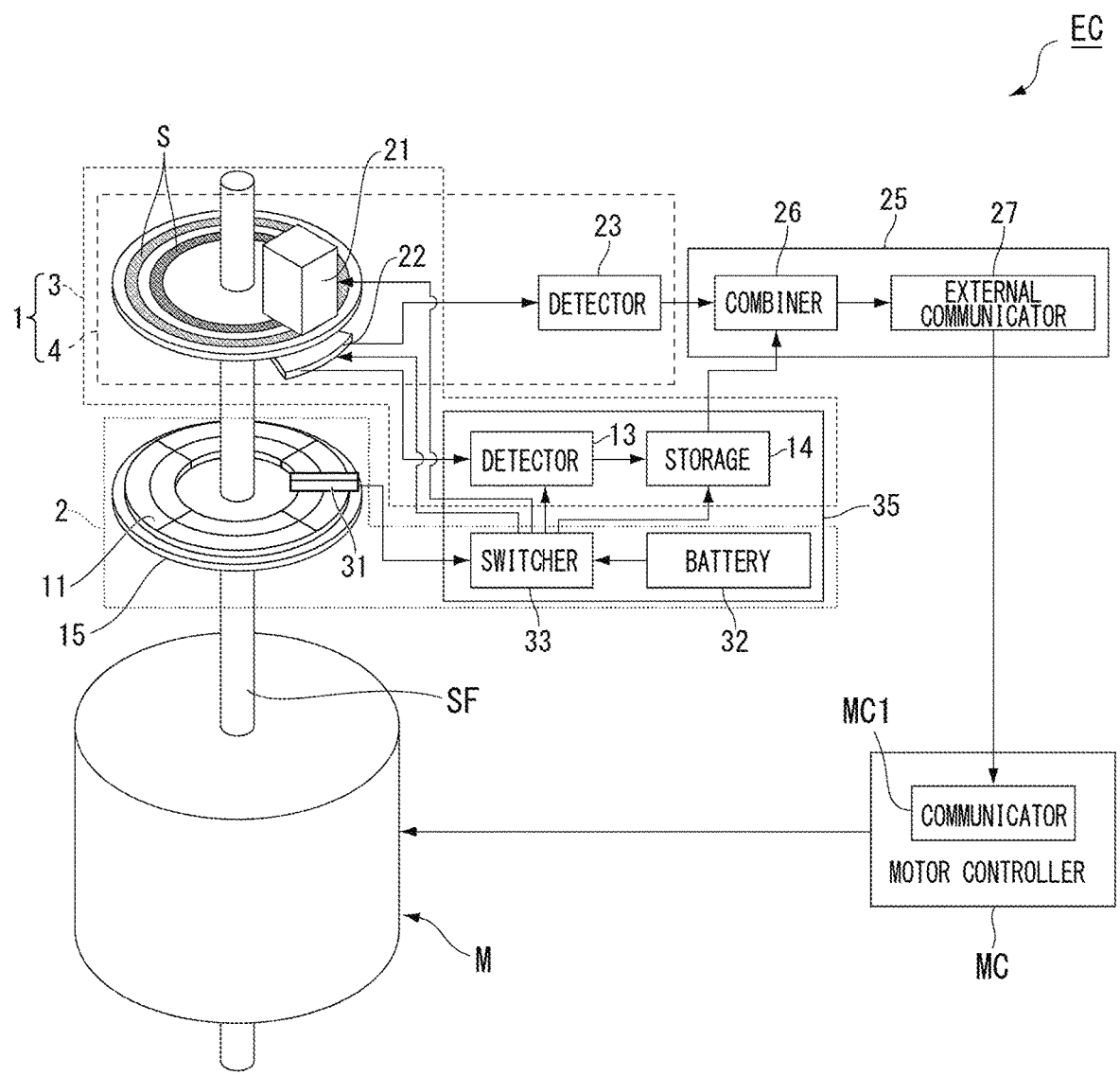
FIG. 8 is a diagram illustrating an encoder apparatus according to a third embodiment.

A third embodiment is described. In the third embodiment, the same configurations as in the above-mentioned embodiments are denoted by the same reference symbols, and descriptions thereof are omitted or simplified. FIG. 8 is a diagram illustrating an encoder apparatus EC according to the third embodiment. The multi-rotation information detector 3 in the first embodiment detects rotation position information on the rotation shaft SF (mover) in a magnetic manner, but a multi-rotation information detector 3 in the third embodiment detects the rotation position information in an optical manner.

The multi-rotation information detector 3 includes a scale S, a light emitting element 21 (irradiator), and a light receiving sensor 22 (optical detector).

The scale S rotates in conjunction with the rotation shaft SF. The light emitting element 21 irradiates the scale S with light. In the state in which the supply of power from outside the encoder apparatus EC is interrupted, the light emitting element 21 irradiates the scale S with light by using power supplied from the battery 32. In the state in which the supply of power from outside the encoder apparatus EC is interrupted, the power supply system 2 intermittently supplies power to the light emitting element 21 in accordance with an electric signal generated by the electric signal generation unit 31. The light receiving sensor 22 detects light from the scale S. The light emitting element 21 detects light from the scale S in the state in which the supply of power from outside the encoder apparatus EC is interrupted. In the state in which the supply of power from outside the encoder apparatus EC is interrupted, the power supply system 2 intermittently supplies power to the light receiving sensor 22 in accordance with an electric signal generated by the electric signal generation unit 31. The detector 13 in the multi-rotation information detector 3 is communicably connected to the light receiving sensor 22, and acquires detection results of the light receiving sensor 22. The detector 13 detects at least a part (for example, multi-rotation information) of rotation position information on the rotation shaft SF based on the detection result of the light receiving sensor 22.

Figure 9:
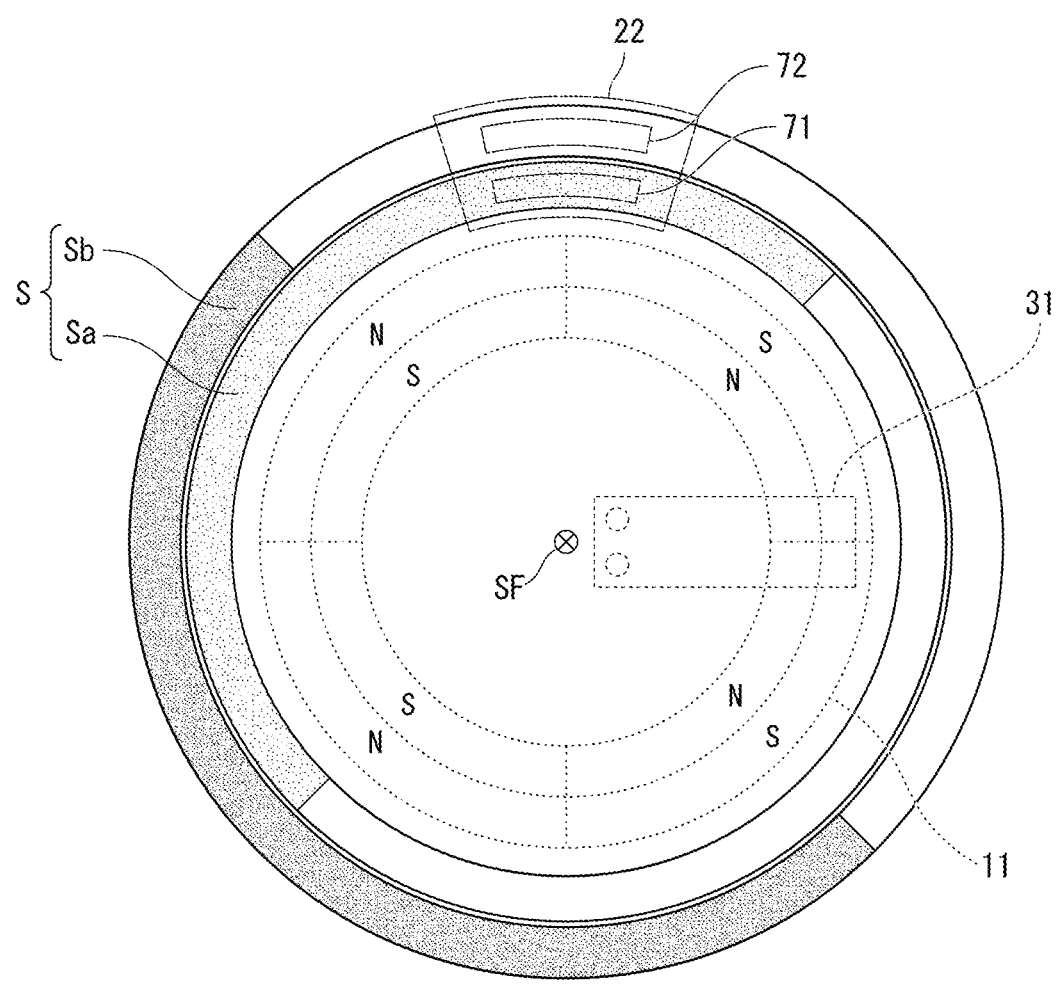
FIG. 9 is a diagram illustrating a magnet, an electric signal generation unit, a scale, and a light receiving element according to the third embodiment.

FIG. 9 is a diagram illustrating a magnet 11, an electric signal generation unit 31, the scale S, and the light receiving sensor 22 according to the third embodiment. In FIG. 9, parts used to detect multi-rotation information are illustrated, and the illustration of parts used to detect angular position information (incremental scale, absolute scale, and corresponding light receivers) is omitted. For example, the magnet 11 is a permanent magnet magnetized with eight poles. The magnet 11 has a shape obtained by combining two concentric ring-shaped magnets. The two ring-shaped magnets are each magnetized with four poles, and N poles and S poles are alternately disposed in the circumferential direction. In the two ring-shaped magnets, N poles and S poles are arranged in the radial direction (radiation direction of rotation shaft SF).

The scale S includes a first scale Sa and a second scale Sb. The first scale Sa and the second scale Sb are ring-shaped members centered at the rotation shaft SF. Optical characteristics (for example, transmissivity, reflectively, and light absorptivity) of the first scale Sa and the second scale Sb change depending on angular positions in the circumferential direction. For example, the optical characteristics of the first scale Sa and the second scale Sb are switched in a binary manner in the circumferential direction with respect to the rotation shaft SF. Angular positions at which the optical characteristics of the first scale Sa and the second scale Sb are switched in a binary manner are set to be different from angular positions of the boundaries between the N poles and the S poles in the circumferential direction of the magnet 11. The second scale Sb is similar to the first scale Sa, but the phase at which the optical characteristics change in the circumferential direction is different from that of the first scale Sa. A phase difference in optical characteristics between the first scale Sa and the second scale Sb is set to the range from more than 0° to less than 180°, and is set to, for example, 90°. The first scale Sa and the second scale Sb may be provided on a member that is different from the incremental scale and the absolute scale, and, for example, may be provided on the disc plate 15 similarly to the magnet 11. In this case, for example, light emitting elements that irradiate the first scale Sa and the second scale Sb with light are provided separately from light emitting elements that irradiate the incremental scale and the absolute scale with light.

The light receiving sensor 22 includes a first light receiver 71 and a second light receiver 72. The first light receiver 71 is disposed at a position through which light that has been emitted from the light emitting element to pass through the first scale Sa (for example, transmitted) enters. For example, the transmissivity of the first scale Sa changes in the circumferential direction. The amount of light that has been emitted from the light emitting element 21 to be transmitted through the first scale Sa changes in accordance with the angular position of the first scale Sa (rotation shaft SF), and the amount of light entering the first light receiver 71 also changes in accordance with the angular position of the first scale Sa (rotation shaft SF).

The second light receiver 72 is disposed at a position through which light that has been emitted from the light emitting element 21 to pass through the second scale Sb (for example, transmitted) enters. For example, the second light receiver 72 is disposed at substantially the same angular position as that of the first light receiver 71 in the circumferential direction of the scale S. For example, the transmissivity of the second scale Sb changes in the circumferential direction. The amount of light that has been emitted from the light emitting element 21 to be transmitted through the second scale Sb changes in accordance with the angular position of the second scale Sb (rotation shaft SF), and the amount of light entering the second light receiver 72 also changes in accordance with the angular position of the second scale Sb (rotation shaft SF).

The first scale Sa and the second scale Sb have a phase difference of optical characteristics, and hence, for example, the detector 13 is capable of using detection results of the first light receiver 71 for an A-phase signal and using detection results of the second light receiver 72 for a B-phase signal. In FIG. 9, the phase of change in optical characteristics is different between the first scale Sa and the second scale Sb, and the angular positions of the first light receiver 71 and the second light receiver 72 are substantially the same. However, the phase of change in optical characteristics may be the same between the first scale Sa and the second scale Sb, and the angular positions of the first light receiver 71 and the second light receiver 72 may be different. Also in this case, the detector 13 is capable of using detection results of the first light receiver 71 for an A-phase signal and using detection results of the second light receiver 72 for a B-phase signal.

Figure 10:
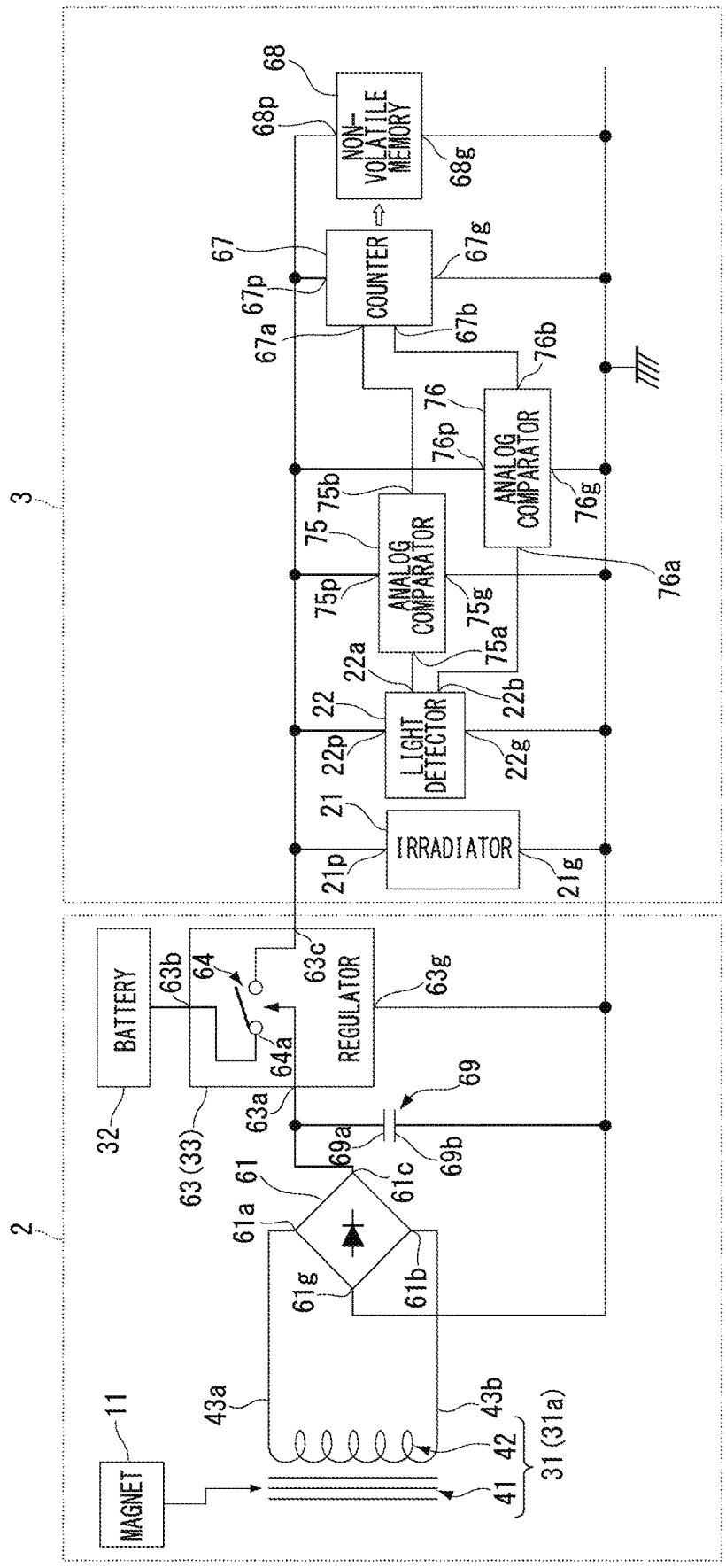
FIG. 10 is a diagram illustrating a circuit configuration of a power supply system and a multi-rotation information detector according to the third embodiment.

FIG. 10 is a diagram illustrating a circuit configuration of the power supply system 2 and the multi-rotation information detector 3 according to the third embodiment. The light emitting element 21 emits light by power supplied from the power supply system 2. A power supply terminal 21p of the light emitting element 21 is connected to the power supply line PL. A ground terminal 21g of the light emitting element 21 is connected to the ground line GL. The light emitting element 21 emits light by power supplied through the power supply terminal 21p and the ground terminal 21g.

The multi-rotation information detector 3 includes, as the detector 13 illustrated in FIG. 6, a light receiving sensor 22, an analog comparator 75, and an analog comparator 76. The light receiving sensor 22 detects light by power supplied from the power supply system 2. A power supply terminal 22p of the light receiving sensor 22 is connected to the power supply line PL. A ground terminal 22g of the light receiving sensor 22 is connected to the ground line GL. The light emitting element 21 emits light by power supplied through the power supply terminal 22p and the ground terminal 22g. An output terminal 22a of the light receiving sensor 22 outputs the detection result of the first light receiver 71 illustrated in FIG. 9. The output terminal 22a is connected to an input terminal 75a of the analog comparator 75. An output terminal 22b of the light receiving sensor 22 outputs the detection result of the second light receiver 72 illustrated in FIG. 9. The output terminal 22b is connected to an input terminal 76a of the analog comparator 76.

The analog comparator 75 is a comparator to compare a voltage output from the first light receiver 71 in the light receiving sensor 22 with a predetermined voltage. A power supply terminal 75p of the analog comparator 75 is connected to the power supply line PL. A ground terminal 75g of the analog comparator 75 is connected to the ground line GL. An output terminal 75b of the analog comparator is connected to the first input terminal 67a of the counter 67. The analog comparator 75 outputs a signal of H level from the output terminal 75b when the output voltage of the first light receiver 71 is equal to or higher than a threshold, and outputs a signal of L level from the output terminal 75b when the output voltage of the first light receiver 71 is lower than the threshold.

The analog comparator 76 is a comparator to compare a voltage output from the second light receiver 72 in the light receiving sensor 22 with a predetermined voltage. A power supply terminal 76p of the analog comparator 76 is connected to the power supply line PL. A ground terminal 76g of the analog comparator 76 is connected to the ground line GL. An output terminal 76b of the analog comparator is connected to the second input terminal 67b of the counter 67. The analog comparator 76 outputs a signal of H level from the output terminal 76b when the output voltage of the second light receiver 72 is equal to or higher than a threshold, and outputs a signal of L level from the output terminal 76b when the output voltage of the second light receiver 72 is lower than the threshold.

Figure 11:
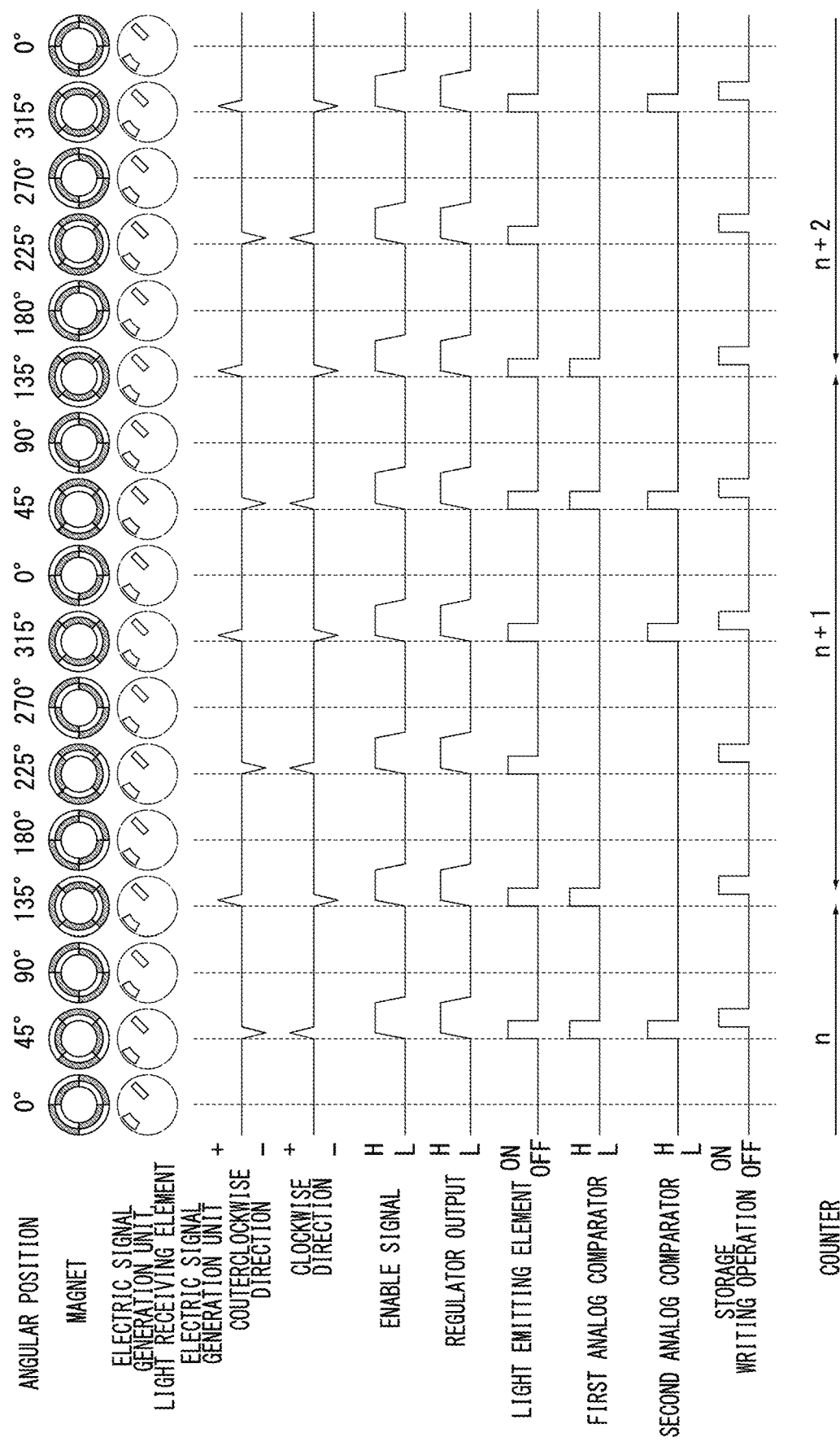
FIG. 11 is a diagram illustrating operation of the encoder apparatus according to the third embodiment.

FIG. 11 is a diagram illustrating the operation of the multi-rotation information detector according to the third embodiment. "MAGNET" in FIG. 11 represents the angular position of the magnet corresponding to the angular position of the rotation shaft SF, and N poles and S poles are illustrated by different types of hatching. "ELECTRIC SIGNAL GENERATION UNIT, LIGHT RECEIVING ELEMENT" represents the angular positions of the electric signal generation unit 31 and the light receiving sensor 22, which are constant irrespective of the angular position of the rotation shaft SF. "ELECTRIC SIGNAL GENERATION UNIT" represents the output of the electric signal generation unit 31, and the output of a current flowing in one direction is positive (+) while the output of a current flowing in the reverse direction is negative (−). The output of the electric signal generation unit 31 when the rotation shaft SF rotates in the counterclockwise direction is indicated by "COUNTERCLOCKWISE DIRECTION", and the output of the electric signal generation unit 31 when the rotation shaft SF rotates in the clockwise direction is indicated by "CLOCKWISE DIRECTION". "ENABLE SIGNAL" represents the potential applied to the control terminal 63a of the regulator 63 in response to the electric signal generated by the electric signal generation unit 31, and High level is represented by "H" while Low level is represented by "L". "REGULATOR" represents the output of the regulator 63, and High level is represented by "H" and Low level is represented by "L".

"FIRST OUTPUT OF LIGHT RECEIVING ELEMENT" and "SECOND OUTPUT OF LIGHT RECEIVING ELEMENT" in FIG. 11 represent the output of the first light receiver 71 and the output of the second light receiver 72, respectively. "FIRST ANALOG COMPARATOR" and "SECOND ANALOG COMPARATOR" represent the outputs from the analog comparator 75 and the analog comparator 76, respectively. The output when the light receiving element and the analog comparator are always driven is indicated by "ALWAYS DRIVEN", and the output when the magnetic sensor and the analog comparator are intermittently driven is indicated by "INTERMITTENTLY DRIVEN".

The sign of the output of the electric signal generation unit 31 is reversed depending on the rotation direction of the rotation shaft SF, but the rectifier stack 61 rectifies the current from the electric signal generation unit 31, and hence the enable signal is the same between the case where the rotation shaft SF rotates in the counterclockwise direction and the case where the rotation shaft SF rotates in the clockwise direction. The enable signal rises to High level (H) at angular positions of 45°, 135°, 225°, and 315°. The output of the regulator 63 becomes High level (H) in response to the rising of the enable signal. When the output of the regulator 63 becomes High level, power is supplied to the light emitting element and the light receiving sensor 22. Then, the light emitting element 21 irradiates the scale S with light, and the light receiving sensor 22 detects light that has been emitted from the light emitting element 21 to pass through the scale S. A pair of the output of the analog comparator and the output of the analog comparator 76 are represented by (0,1), where "1" is H and "0" is L. Pairs of the output of the analog comparator 75 and the output of the analog comparator 76 are (1,1), (1,0), (0,0), and (0,1) at angular positions of 45°, 135°, 225°, and 315°, respectively. Thus, the four angular positions are distinguishable based on the pairs of the output of the analog comparator 75 and the output of the analog comparator 76. The counter 67 uses the output of the analog comparator 75 and the output of the analog comparator 76 to detect multi-rotation information on the rotation shaft SF similarly to the first embodiment, for example. The storage 14 stores therein the multi-rotation information detected by the counter 67.

Fourth Embodiment

Figure 12:
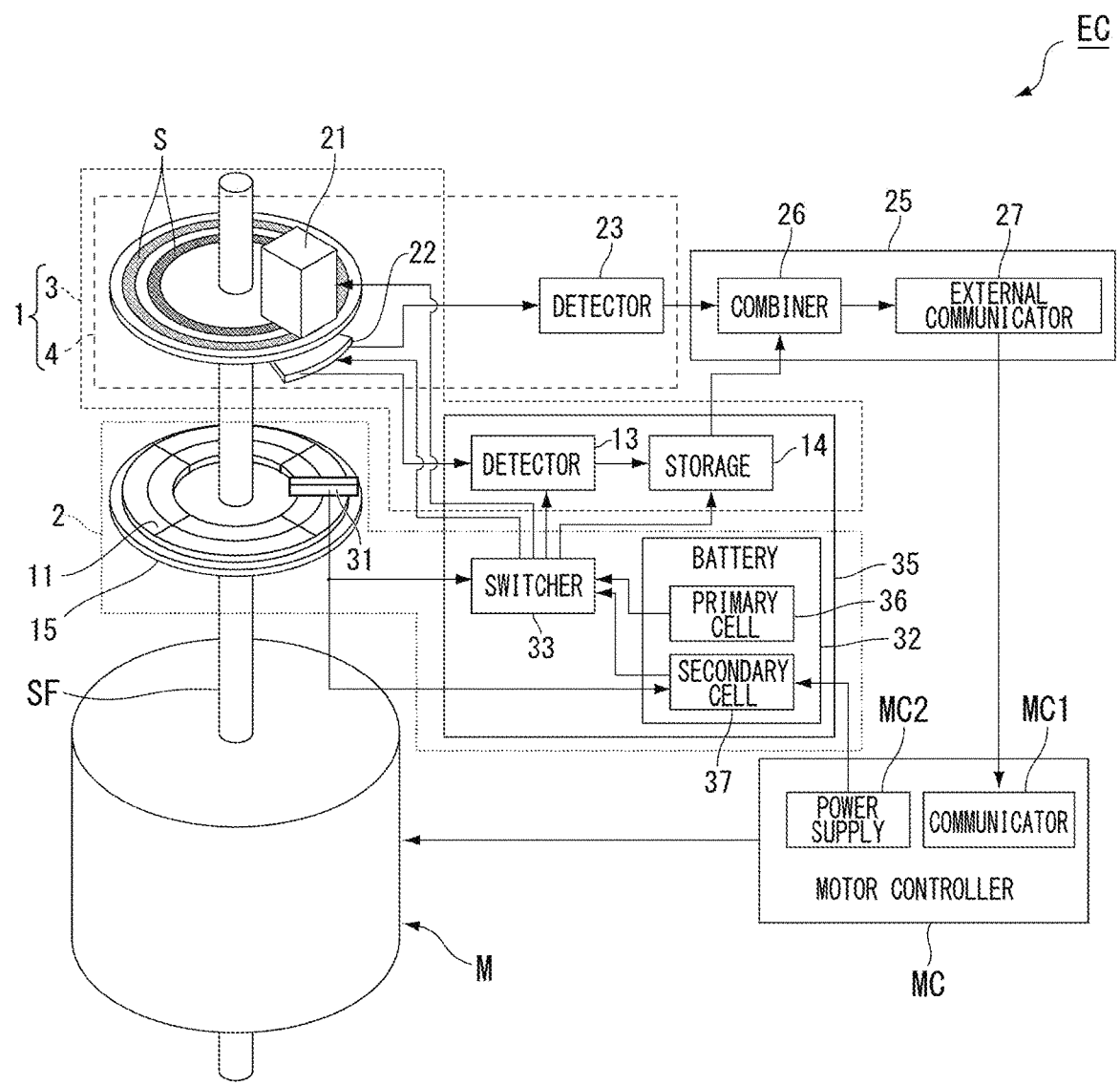
FIG. 12 is a diagram illustrating an encoder apparatus according to a fourth embodiment.

A fourth embodiment is described. In the fourth embodiment, the same configurations as in the above-mentioned embodiments are denoted by the same reference symbols, and descriptions thereof are omitted or simplified. FIG. 12 is a diagram illustrating an encoder apparatus EC according to the fourth embodiment. In the fourth embodiment, a battery 32 includes a primary cell 36 and a secondary cell 37. A motor controller MC includes a power supply MC2, and the secondary cell 37 is charged with power supplied from the power supply MC2. For example, the battery 32 and the power supply MC2 may be the same as those described in the second embodiment. The battery 32 is capable of supplying at least a part of the power consumed by the position detection system 1 from the primary cell 36 and from the secondary cell 37.

Figure 13:
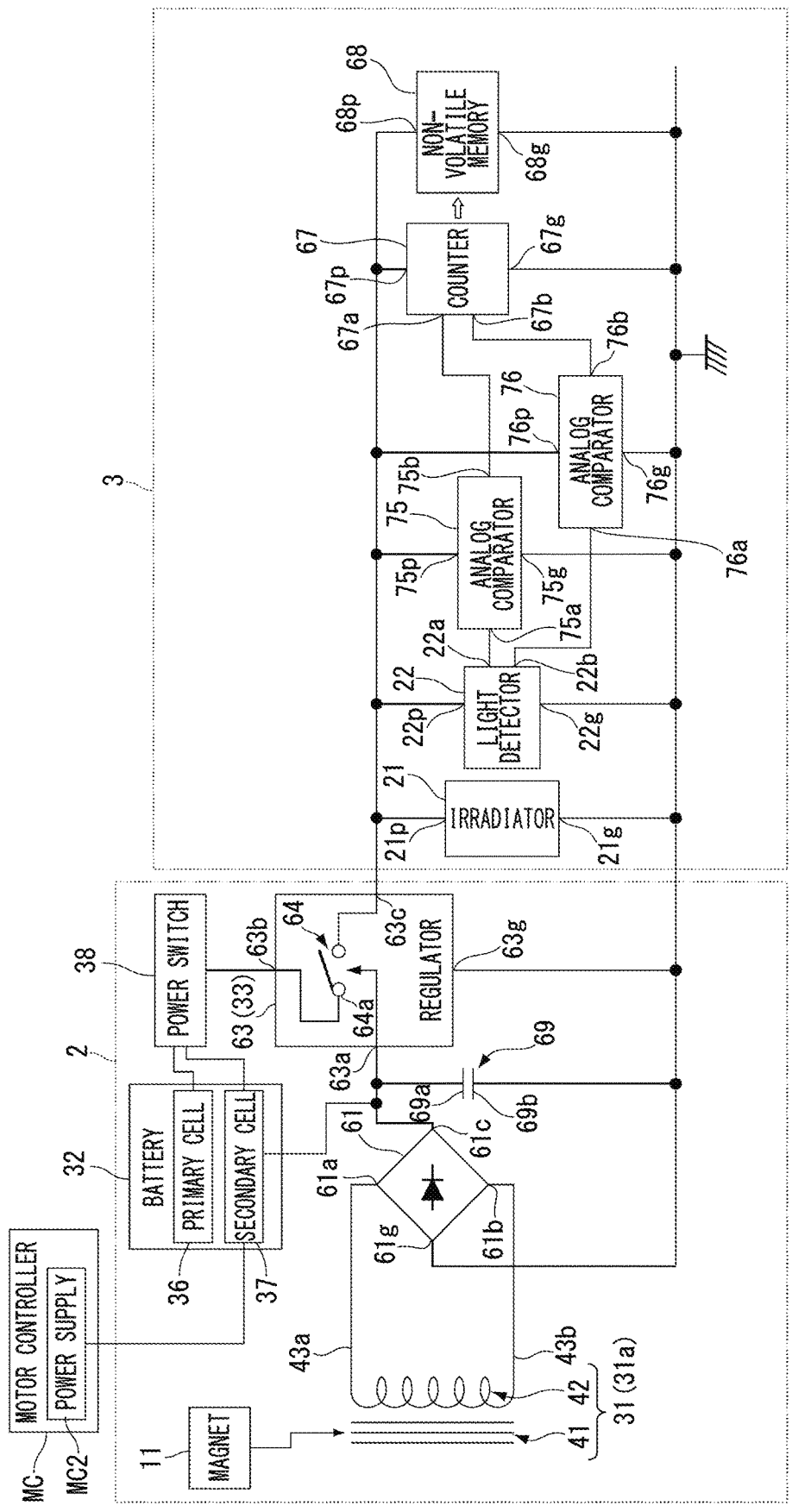
FIG. 13 is a diagram illustrating a circuit configuration of a power supply system and a multi-rotation information detector according to the fourth embodiment.

FIG. 13 is a diagram illustrating the encoder apparatus EC according to the fourth embodiment. In at least a part of a period during which the power supply MC2 in the motor controller MC is capable of supplying power (for example, the on state of the main power supply), the secondary cell 37 is supplied with power from the power supply MC2, and is charged with the power. In a period during which the power supply MC2 in the motor controller MC is incapable of supplying power (for example, the off state of the main power supply), the supply of power from the power supply MC2 to the secondary cell 37 is interrupted. The secondary cell 37 may be able to be charged with power of an electric signal from the electric signal generation unit 31.

The encoder apparatus EC according to the fourth embodiment selects which of the primary cell 36 and the secondary cell 37 is used to supply power to the position detection system 1 in the state in which the supply of power from the outside is interrupted. The encoder apparatus EC according to the fourth embodiment uses the secondary cell 37 in combination, thus enabling the wear of the primary cell 36 to be delayed. Consequently, the encoder apparatus EC is free from maintenance (for example, replacement) of the battery 32 or has low frequency of maintenance.

Figure 14A:
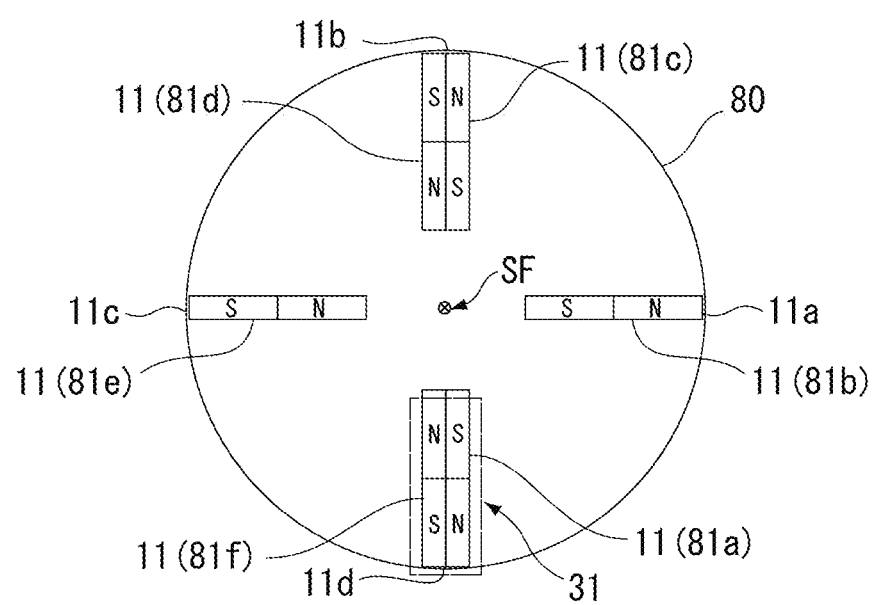
FIG. 14A to FIG. 14D include diagrams illustrating modifications.

Next, modifications are described. FIG. 14A to FIG. 14D are diagrams illustrating a part of encoder apparatuses in the modifications. The magnet 11 in each of the above-mentioned embodiments generates an AC magnetic field by the ring-shaped magnet (see FIG. 2A to FIG. 2C), but magnets 11 in FIG. 14A are rod magnets that generate an AC magnetic field. In the present modification, the magnets 11 include rod magnets 81a to 81f provided on a disc-shaped plate 80.

The plate 80 is fixed to a rotation shaft SF, and rotates integrally with the rotation shaft SF. The rod magnets 81a to 81f are fixed to the plate 80, and rotate integrally with the plate 80 and the rotation shaft SF. Each of the rod magnets 81a to 81f is disposed in substantially parallel to the radial direction of the plate 80.

The rod magnets 81a to 81c are disposed such that S poles face the center of the plate 80 (rotation shaft SF) and N poles face the radiation direction with respect to the rotation shaft SF (outer side of the plate 80). The rod magnet 81a is disposed near a position 11d on the plate 80. The rod magnet 81b is disposed at a position 11a on the plate 80. The rod magnet 81c is disposed near a position 11b on the plate 80.

The rod magnets 81d to 81f are disposed such that N poles face the center of the plate 80 (rotation shaft SF) and S poles face the radiation direction with respect to the rotation shaft SF (outer side of the plate 80). The rod magnet 81d is disposed near the position 11b on the plate 80 so as to be adjacent to the rod magnet 81c. The rod magnet 81e is disposed at a position 11c on the plate 80. The rod magnet 81f is disposed near the position 11d on the plate 80 so as to be adjacent to the rod magnet 81a.

In these magnets 11, when the position 11b or the position 11d on the plate 80 passes near the electric signal generation unit 31, the orientation of the magnetic field in the electric signal generation unit 31 is inverted, and power is output from the electric signal generation unit 31.

Figure 14B:
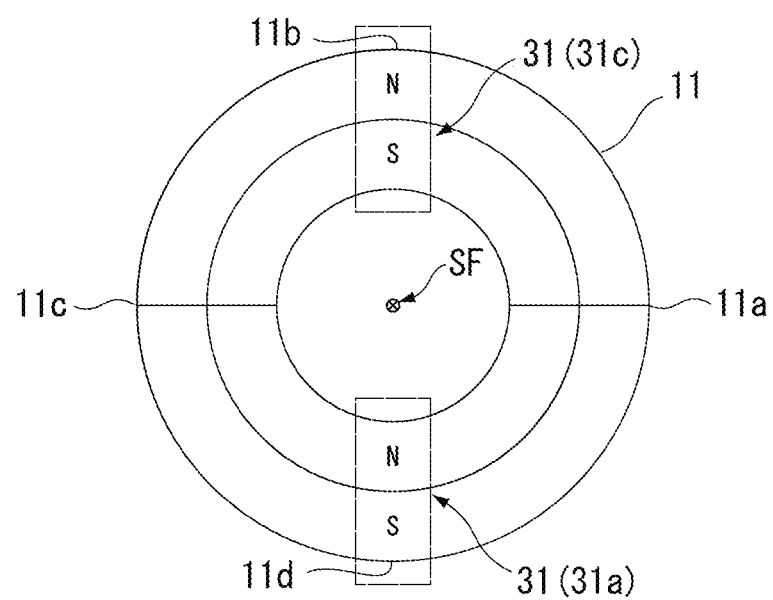

In a modification in FIG. 14B, an electric signal generation unit 31a and an electric signal generation unit 31c are provided as electric signal generation units 31. The electric signal generation unit 31c is disposed with a phase difference of 180° from the electric signal generation unit 31a in the circumferential direction of the magnet 11. When the position 11a on the magnet 11 passes near the electric signal generation unit 31a, the position 11c on the magnet 11 passes near the electric signal generation unit 31c. In this manner, the electric signal generation unit 31a and the electric signal generation unit 31c generate power at substantially the same time, thus enabling power (level of electric signals) generated by the electric signal generation units 31 to be increased.

Figure 14C:
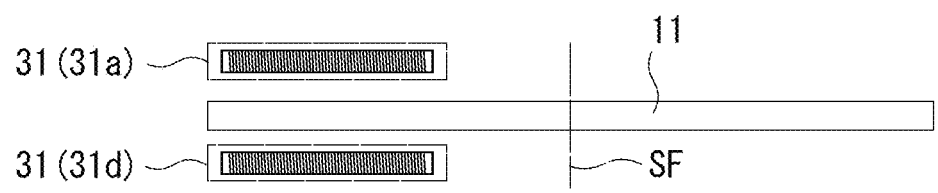

In a modification in FIG. 14C, an electric signal generation unit 31a and an electric signal generation unit 31d are provided as electric signal generation units 31. The electric signal generation unit 31d is provided on the side opposite to the electric signal generation unit 31a across the magnet 11. For example, the electric signal generation unit 31d is provided at the same angular position as that of the electric signal generation unit 31a in the circumferential direction of the magnet 11. In this encoder apparatus EC, the electric signal generation unit 31a and the electric signal generation unit 31d generate power at substantially the same time, thus enabling power consumed by a detection system or the like to be easily supplied.

Figure 14D:
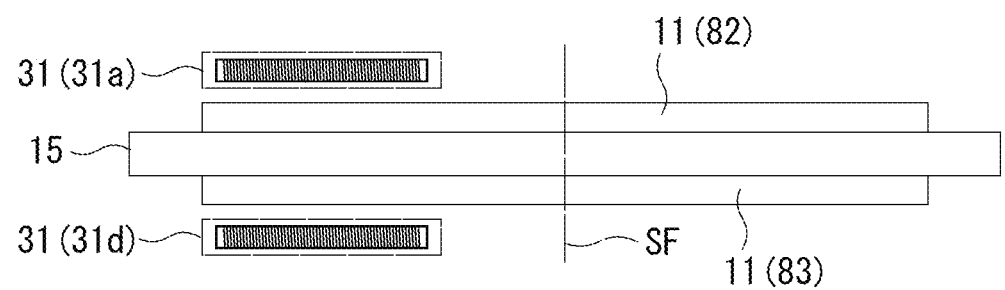

In a modification in FIG. 14D, a magnet 82 and a magnet 83 are provided as magnets 11. An electric signal generation unit 31a and an electric signal generation unit 31d are provided as electric signal generation units 31. The magnet 82 is disposed on the front surface of the disc plate 15 illustrated in FIG. 1 and others, and the magnet 83 is disposed on the rear surface thereof. The electric signal generation unit 31a is disposed near the magnet 82, and generates power in response to a change in the magnetic field formed by the magnet 82. The electric signal generation unit 31d is disposed near the magnet 83, and generates power in response to a change in the magnetic field formed by the magnet 83. In this manner, when a plurality of electric signal generation units are provided, the magnet 82 paired with the electric signal generation unit 31a and the magnet 83 paired with the electric signal generation unit 31d may be different members.

As in the above-mentioned modifications, when a plurality of electric signal generation units are provided, power output from the electric signal generation unit 31c may be used as a detection signal to detect multi-rotation information, or may be used for supply to a detection system or the like. The number of electric signal generation units in the encoder apparatus EC may be three or more. The electric signal generation unit may be configured such that the magnetosensors and the generators are provided on one surface side and the other surface side of the magnets 11, and the magnetosensors and the generators are housed in one casing.

In the above-mentioned first embodiment, the magnet 11 is a 4-pole magnet having two poles in the circumferential direction and two poles in the radial direction, but the configuration is not limited thereto and can be appropriately changed. For example, the number of poles in the circumferential direction of the magnet 11 may be four or more, and the magnet 11 may be an 8-pole magnet having four poles in the circumferential direction and two poles in the radial direction.

In the above-mentioned embodiments, the position detection system 1 detects rotation position information on the rotation shaft SF (mover) as position information, but may detect at least one of the position, speed, and acceleration in a predetermined direction as position information. The encoder apparatus EC may include a rotary encoder or a linear encoder. In the encoder apparatus EC, the generator and the detector may be provided to the rotation shaft SF and the magnet 11 may be provided outside the moving object (for example, the rotation shaft SF), such that the relative positions of the magnet and the detector change along with the movement of the mover. The position detection system 1 is not necessarily required to detect multi-rotation information on the rotation shaft SF, and the multi-rotation information may be detected by a processor outside the position detection system 1.

In the above-mentioned embodiments, the electric signal generation unit 31 generates power (electric signal) when the electric signal generation unit 31 has a predetermined positional relation with the magnet 11. The position detection system 1 may use a change in power generated by the electric signal generation unit 31 as a detection signal to detect position information on the mover (for example, the rotation shaft SF). For example, the electric signal generation unit 31 may be used as a sensor, and the position detection system 1 may detect position information on the mover by the electric signal generation unit 31 and one or more sensors (for example, magnetic sensors, light receiving sensors). When the number of electric signal generation units is two or more, the position detection system 1 may use two or more electric signal generation units as sensors to detect position information. For example, the position detection system 1 may use two or more electric signal generation units as sensors, and may detect position information on the mover without using magnetic sensors or detect position information on the mover without using light receiving sensors.

The electric signal generation unit 31 may supply at least a part of the power consumed by the position detection system 1. For example, the electric signal generation unit 31 may supply power to a processor having relatively small power consumption in the position detection system 1. The power supply system 2 is not necessarily required to supply power to a part of the position detection system 1. For example, the power supply system 2 may intermittently supply power to the detector 13, and is not necessarily required to supply power to the storage 14. In this case, the storage 14 may be supplied with power intermittently or continuously from a power supply or a battery provided outside the power supply system 2. The generator may generate power by a phenomenon other than large Barkhausen jump, and for example, may generate power by electromagnetic induction caused by a change in the magnetic field in response to the movement of a mover (for example, the rotation shaft SF). The storage that stores therein detection results of the detector may be provided outside the position detection system 1, and may be provided outside the encoder apparatus EC.

Drive Apparatus

Figure 15:
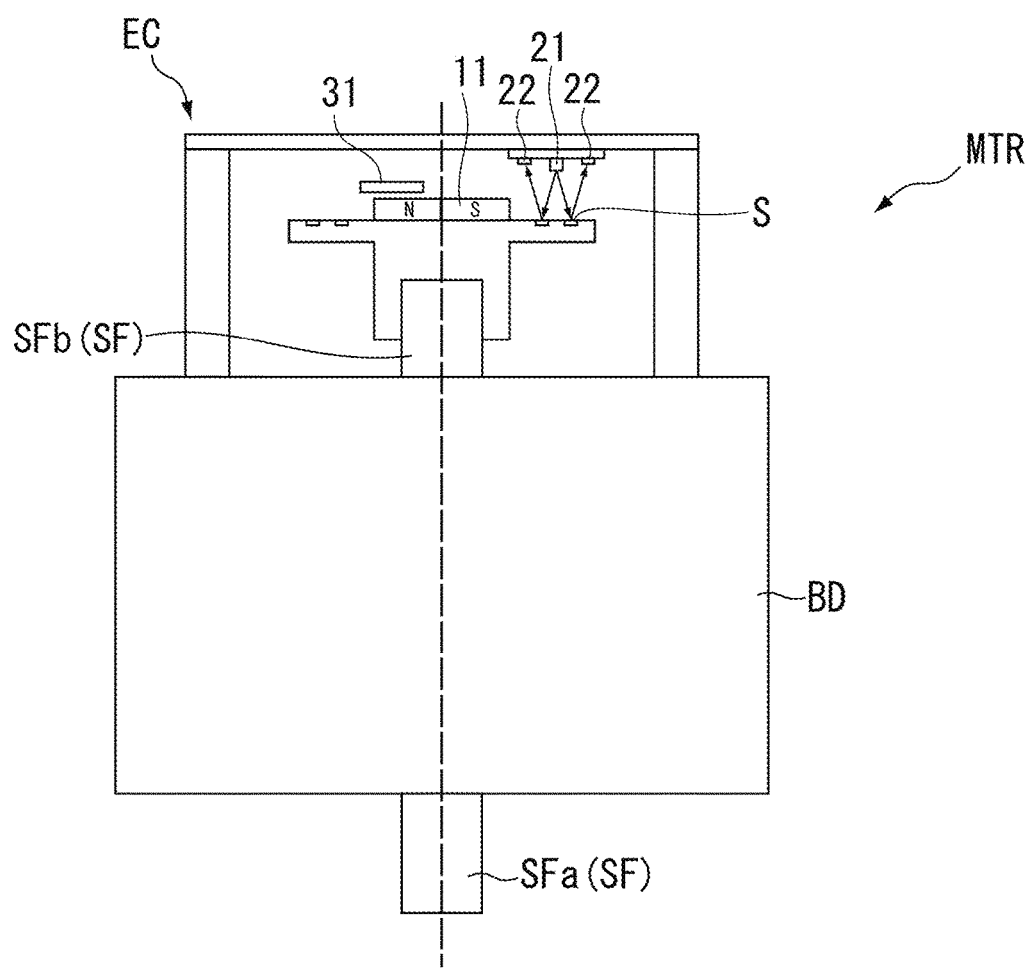
FIG. 15 is a diagram illustrating a drive apparatus according to an embodiment.

Next, a drive apparatus is described. FIG. 15 is a diagram illustrating an example of a drive apparatus MTR. In the following description, the same or equivalent components as in the above-mentioned embodiments are denoted by the same reference symbols, and descriptions thereof are omitted or simplified. The drive apparatus MTR is a motor apparatus including an electric motor. The drive apparatus MTR includes a rotation shaft SF, a main body (driver) BD that rotationally drives the rotation shaft SF, and an encoder apparatus EC that detects rotation position information on the rotation shaft SF.

The rotation shaft SF has a load-side end SFa and an anti-load-side end SFb. The load-side end SFa is connected to another power transmission mechanism such as a reducer. A scale S is fixed to the anti-load-side end SFb through a fixture. The encoder apparatus EC is mounted together with the fixation of the scale S. The encoder apparatus EC is an encoder apparatus according to the above-mentioned embodiments, modifications, and a combination thereof.

In the drive apparatus MTR, the motor controller MC illustrated in FIG. 1 and others controls the main body BD by using a detection result of the encoder apparatus EC. In the drive apparatus MTR, the need of battery replacement of the encoder apparatus EC is eliminated or lowered, thus enabling maintenance cost to be reduced. The drive apparatus MTR is not limited to a motor apparatus, and may be another drive apparatus having a shaft that rotates by using hydraulic pressure or pneumatic pressure.

Stage Apparatus

Figure 16:
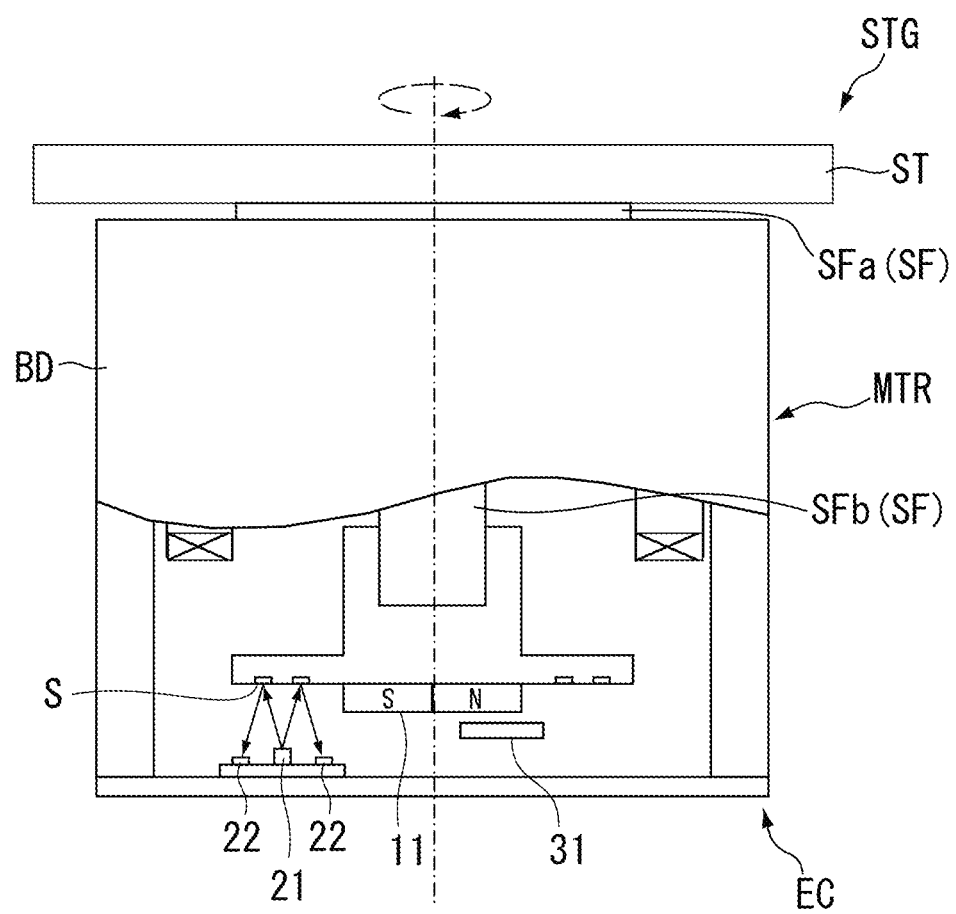
FIG. 16 is a diagram illustrating a stage apparatus according to an embodiment.

Next, a stage apparatus is described. FIG. 16 is a diagram illustrating a stage apparatus STG. The stage apparatus STG has a configuration in which a rotary table (moving object) TB is mounted to the load-side end SFa of the rotation shaft SF of the drive apparatus MTR illustrated in FIG. 15. In the following description, the same or equivalent components as in the above-mentioned embodiments are denoted by the same reference symbols, and descriptions thereof are omitted or simplified.

In the stage apparatus STG, when the drive apparatus MTR is driven to rotate the rotation shaft SF, the rotation of the rotation shaft SF is transmitted to the rotary table TB. At this time, the encoder apparatus EC detects an angular position or the like of the rotation shaft SF. The use of the output from the encoder apparatus EC thus enables an angular position of the rotary table TB to be detected. A reducer or other components may be arranged between the load-side end SFa of the drive apparatus MTR and the rotary table TB.

As described above, in the stage apparatus STG, the need of battery replacement of the encoder apparatus EC is lowered or eliminated, thus reducing maintenance cost. For example, the stage apparatus STG is applicable to a rotary table provided to a working machine such as a lathe.

Robot Apparatus

Figure 17:
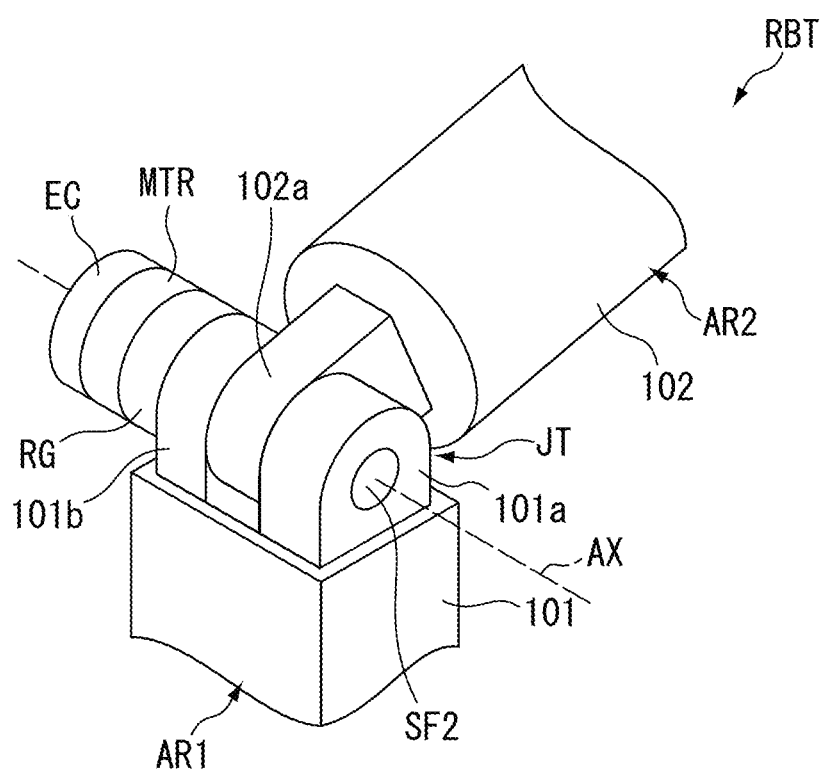
FIG. 17 is a diagram illustrating a robot apparatus according to an embodiment.

Next, a robot apparatus is described. FIG. 17 is a perspective view illustrating a robot apparatus RBT. In FIG. 17, a part of the robot apparatus RBT (joint) is schematically illustrated. In the following description, the same or equivalent components as in the above-mentioned embodiments are denoted by the same reference symbols, and descriptions thereof are omitted or simplified. The robot apparatus RBT includes a first arm AR1, a second arm AR2, and a joint JT. The first arm AR1 is connected to the second arm AR2 through the joint JT.

The first arm AR1 includes an arm 101, a bearing 101a, and a bearing 101b. The second arm AR2 has an arm 102 and a connector 102a. The connector 102a is disposed between the bearing 101a and the bearing 101b at the joint JT. The connector 102a is provided integrally with a rotation shaft SF2. The rotation shaft SF2 is inserted through both the bearing 101a and the bearing 101b at the joint JT. An end of the rotation shaft SF2 that is inserted through the bearing 101b passes through the bearing 101b and is connected to a reducer RG.

The reducer RG is connected to the drive apparatus MTR, and reduces the rotation of the drive apparatus MTR to, for example, 1/100 and transmits the reduced rotation of the drive apparatus MTR to the rotation shaft SF2. Although not illustrated in FIG. 17, a load-side end SFa of the rotation shaft SF of the drive apparatus MTR is connected to the reducer RG. A scale S of the encoder apparatus EC is mounted to an anti-load-side end SFb of the rotation shaft SF of the drive apparatus MTR.

In the robot apparatus RBT, when the drive apparatus MTR is driven to rotate the rotation shaft SF, the rotation of the rotation shaft SF is transmitted to the rotation shaft SF2 through the reducer RG. The connector 102a rotates integrally with the rotation shaft SF2 by the rotation of the rotation shaft SF2. Thus, the second arm AR2 rotates with respect to the first arm AR1. At this time, the encoder apparatus EC detects the angular position and the like of the rotation shaft SF. The use of the output from the encoder apparatus EC thus enables the angular position of the second arm AR2 to be detected.

As described above, in the robot apparatus RBT, the need of battery replacement of the encoder apparatus EC is eliminated or lowered, thus enabling maintenance cost to be reduced. The robot apparatus RBT is not limited to the above-mentioned configuration, and the drive apparatus MTR is applicable to various kinds of robot apparatuses having joints.

The technical scope of the present invention is not limited to the aspects described in the above-mentioned embodiments. One or more elements described in the above-mentioned embodiments may be omitted. The elements described in the above-mentioned embodiments are able to be combined as appropriate. As far as permitted by the applicable law, the disclosure of all the documents cited in the above-mentioned embodiments, for example, is incorporated herein by reference.

DESCRIPTION OF REFERENCE SIGNS 1 position detection system, 3 multi-rotation information detector, 4 angle detector, 11 magnet, 12 magnetic detector, 13 detector, 14 storage, 21 light emitting element (irradiator), 22 light receiving sensor (light detector), 31 electric signal generation unit, 32 battery, 33 switcher, 35 holder, 36 primary cell, 37 secondary cell, 41 first magnetosensor, 42 first generator, second magnetosensor, 46 second generator, 51, 52 magnetic sensor, 63 regulator, 64 switch, 67 counter, EC encoder apparatus, SF rotation shaft, AR1 first arm, AR2 second arm, MTR drive apparatus, RBT robot apparatus, S scale, STG stage apparatus

What is claimed is:

1. An encoder apparatus, comprising:

a position detection system including a detector that detects position information on a mover;

an electric signal generator having a Wiegand wire that generates an electric signal in response to movement of the mover; and a battery that supplies at least a part of power consumed by the position detection system in accordance with the electric signal generated by the Wiegand wire of the electric signal generator, wherein the battery includes a primary cell and a secondary cell, the secondary cell is charged, at least in part, by power from the electric signal generated by the Wiegand wire of the electric signal generator, and the encoder apparatus includes a selector that selects which of the primary cell and the secondary cell is used to supply power to the position detection system.

2. The encoder apparatus according to claim 1, further comprising a switcher that switches between supply and no supply of power from the battery to the position detection system in accordance with the electric signal generated by the Wiegand wire of the electric signal generator.

3. The encoder apparatus according to claim 2, wherein the switcher initiates supply of power from the battery to the position detection system when a level of the electric signal generated by the Wiegand wire of the electric signal generator becomes equal to or higher than a threshold, and stops causing the supply of power from the battery to the position detection system when the level of the electric signal generated by the Wiegand wire of the electric signal generator becomes lower than the threshold.

4. The encoder apparatus according to claim 3, wherein the Wiegand wire of the electric signal generator generates pulsed power in response to movement of the mover.

5. The encoder apparatus according to claim 2, wherein the switcher includes a switch provided in a power supply path between the battery and the position detection system, and operation of the switch is controlled based on the electric signal generated by the Wiegand wire of the electric signal generator.

6. The encoder apparatus according to claim 5, wherein the switcher includes a regulator that adjusts power supplied from the battery to the position detection system, the regulator includes the switch, and the electric signal generated by the Wiegand wire of the electric signal generator is used as a control signal for the regulator.

7. The encoder apparatus according to claim 1, wherein the selector selects which of the primary cell and the secondary cell is used to supply the power to the position detection system based on a remaining amount of charge of the secondary cell.

8. The encoder apparatus according to claim 1, further comprising a holder that holds at least a part of the position detection system and the battery.

9. The encoder apparatus according to claim 1, wherein the detector detects the position information by using power supplied from the battery.

10. The encoder apparatus according to claim 9, wherein the detector includes a magnet and a magnetic detector that change relative positions in response to movement of the mover, the detector detects the position information based on a magnetic field formed by the magnet, and the magnetic detector detects the magnetic field formed by the magnet by using power supplied from the battery.

11. The encoder apparatus according to claim 9, wherein the detector includes:

a scale that moves in conjunction with the mover;

an irradiator that irradiates the scale with light by using power supplied from the battery; and an optical detector that detects light from the scale by using power supplied from the battery.

12. The encoder apparatus according to claim 1, wherein the mover includes a rotation shaft, and the detector includes:

an angle detector that detects angular position information within one rotation of the rotation shaft; and a multi-rotation information detector that detects multi-rotation information on the rotation shaft as the position information.

13. The encoder apparatus according to claim 12, wherein the multi-rotation information detector includes a counter that counts the multi-rotation information on the rotation shaft by using power supplied from the battery.

14. The encoder apparatus according to claim 12, further comprising a combiner that combines the angular position information from the angle detector and the multi-rotation information from the multi-rotation information detector to calculate rotation position information.

15. The encoder apparatus according to claim 1, wherein the position detection system includes a storage that stores therein the position information detected by the detector by using power supplied from the battery.

16. The encoder apparatus according to claim 1, wherein the electric signal generator includes:

a magnet that moves in conjunction with the mover; and the Wiegand wire causes large Barkhausen jump by a change in a magnetic field caused by movement of the magnet.

17. The encoder apparatus according to claim 16, wherein the detector includes a magnetic detector that detects a magnetic field formed by the magnet by using power supplied from the battery, and the detector detects position information on the mover by the magnetic detector.

18. The encoder apparatus according to claim 17, wherein the mover includes a rotation shaft, the magnetosensor includes a first magnetosensor and a second magnetosensor that sense the magnetic field formed by the magnet, the magnetic detector includes a first magnetic sensor and a second magnetic sensor disposed in a rotation direction of the rotation shaft, the second magnetosensor is disposed at an angular position of more than 0° and less than 180° with respect to the first magnetosensor in the rotation direction of the rotation shaft, the first magnetic sensor is disposed at an angular position of more than 0° and less than 90° with respect to the first magnetosensor in the rotation direction of the rotation shaft, and the second magnetic sensor is disposed at an angular position of more than 90° and less than 180° with respect to the first magnetosensor in the rotation direction of the rotation shaft.

19. A drive apparatus, comprising:

the encoder apparatus according to claim 1; and a power supplier that supplies power to the mover.

20. A stage apparatus, comprising:

a moving object; and the drive apparatus according to claim 19 that moves the moving object.

21. A robot apparatus, comprising:

the drive apparatus according to claim 19; and a first arm and a second arm that are relatively moved by the drive apparatus.

* * * * *